(12) United States Patent
Chen et al.

(10) Patent No.: US 7,533,154 B1
(45) Date of Patent: May 12, 2009

(54) DESCRIPTOR MANAGEMENT SYSTEMS AND METHODS FOR TRANSFERRING DATA OF MULTIPLE PRIORITIES BETWEEN A HOST AND A NETWORK

(75) Inventors: Steven Yencheng Chen, Fremont, CA (US); Jeffrey Dwork, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 788 days.

(21) Appl. No.: 10/771,590

(22) Filed: Feb. 4, 2004

(51) Int. Cl.
*G06F 15/173* (2006.01)
(52) U.S. Cl. .................................................... 709/213
(58) Field of Classification Search ................. 709/213, 709/223, 236
See application file for complete search history.

(56) References Cited

U.S. PATENT DOCUMENTS

| | | | |
|---|---|---|---|
| 4,658,351 A * | 4/1987 | Teng | 718/103 |
| 5,043,981 A * | 8/1991 | Firoozmand et al. | 370/235 |
| 5,223,606 A * | 6/1993 | Blaudin de The et al. | 530/350 |
| 5,375,223 A * | 12/1994 | Meyers et al. | 711/151 |
| 5,513,320 A | 4/1996 | Young et al. | |
| 5,521,916 A * | 5/1996 | Choudhury et al. | 370/414 |
| 5,633,865 A | 5/1997 | Short | |
| 5,724,358 A * | 3/1998 | Headrick et al. | 370/418 |
| 5,745,790 A | 4/1998 | Oskouy | |
| 5,805,816 A | 9/1998 | Picazo, Jr. et al. | |
| 5,812,774 A | 9/1998 | Kempf et al. | |
| 5,828,901 A | 10/1998 | O'Toole et al. | |
| 5,852,719 A | 12/1998 | Fishler et al. | |
| 5,870,627 A | 2/1999 | O'Toole et al. | |
| 6,012,118 A | 1/2000 | Jayakumar et al. | |
| 6,049,842 A | 4/2000 | Garrett et al. | |
| 6,070,194 A | 5/2000 | Yu et al. | |
| 6,091,734 A | 7/2000 | Suzuki et al. | |
| 6,145,016 A | 11/2000 | Lai et al. | |
| 6,182,164 B1 | 1/2001 | Williams | |
| 6,182,165 B1 | 1/2001 | Spilo | |
| 6,199,124 B1 | 3/2001 | Ramakrishnan et al. | |
| 6,212,593 B1 | 4/2001 | Pham et al. | |
| 6,304,911 B1 | 10/2001 | Brcich et al. | |
| 6,324,595 B1 | 11/2001 | Tsai et al. | |
| 6,327,615 B1 | 12/2001 | Kasper | |
| 6,327,625 B1 | 12/2001 | Wang et al. | |
| 6,334,162 B1 | 12/2001 | Garrett et al. | |
| 6,401,145 B1 | 6/2002 | Baskey et al. | |

(Continued)

OTHER PUBLICATIONS

Office Action for U.S. Appl. No. 10/676,758 Mailed Feb. 22, 2008.

(Continued)

*Primary Examiner*—David Y Eng
(74) *Attorney, Agent, or Firm*—Eschweiler & Associates, LLC

(57) ABSTRACT

Methods and network interface systems are provided for transferring data between a host and a network using a shared memory, in which separate data transfer queues are employed for transfer of data of different priorities. For receive data, the network interface scrutinizes the data and provides a corresponding entry in a receive data transfer queue of a particular priority according to the data. For transmit data, the network interface transmits data corresponding to entries in lower priority queues when all higher priority data has been transmitted or when a certain number of higher priority data frames have been transferred while a lower priority frame is waiting to be sent.

10 Claims, 16 Drawing Sheets

U.S. PATENT DOCUMENTS

| | | | |
|---|---|---|---|
| 6,427,173 | B1 | 7/2002 | Boucher et al. |
| 6,515,993 | B1 | 2/2003 | Williams et al. |
| 6,529,945 | B1 | 3/2003 | Calhoun et al. |
| 6,570,876 | B1 * | 5/2003 | Aimoto ............... 370/389 |
| 6,581,113 | B1 | 6/2003 | Dwork et al. |
| 6,732,209 | B1 * | 5/2004 | Cherukuri et al. ........... 710/240 |
| 6,842,821 | B2 * | 1/2005 | Nystuen ............... 711/105 |
| 6,891,835 | B2 * | 5/2005 | Kalkunte et al. ....... 370/395.41 |
| 6,970,921 | B1 * | 11/2005 | Wang et al. ............... 709/220 |
| 7,016,302 | B1 * | 3/2006 | Schramm et al. ........... 370/235 |
| 7,047,531 | B2 * | 5/2006 | Dorland et al. ............. 718/103 |
| 7,274,792 | B2 | 9/2007 | Chin et al. |
| 2002/0009075 | A1 | 1/2002 | Fesas, Jr. |
| 2002/0013821 | A1 | 1/2002 | Kasper |
| 2002/0174255 | A1 | 11/2002 | Hayter et al. |
| 2002/0188742 | A1 | 12/2002 | Nie |
| 2002/0194415 | A1 | 12/2002 | Lindsay et al. |
| 2004/0193733 | A1 | 9/2004 | Vangal et al. |
| 2005/0213603 | A1 | 9/2005 | Kraighattam et al. |

OTHER PUBLICATIONS

Office Action for U.S. Appl. No. 10/816,656 Mailed Nov. 15, 2007.

Response to Office Action for U.S. Appl. No. 10/816,656, filed Feb. 14, 2008.

Office Action mailed in Sep. 30, 2008 for U.S. Appl. No. 10/816,661.

* cited by examiner

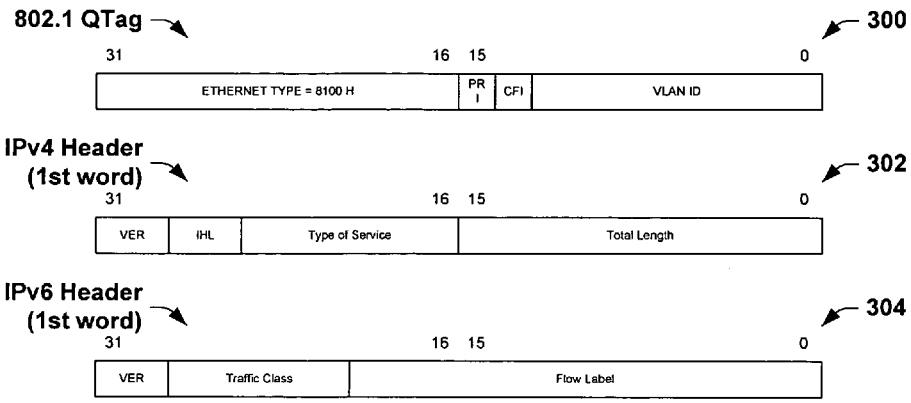
Fig. 1H
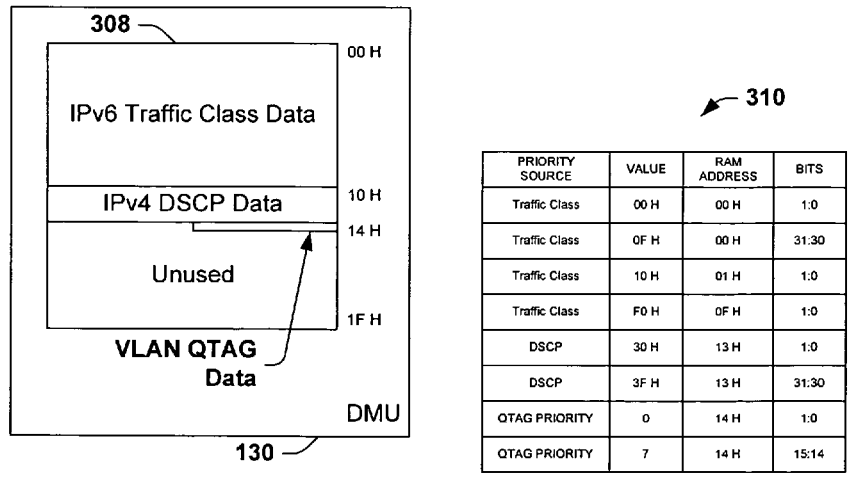
Fig. 1I
Fig. 1J
Fig. 1K

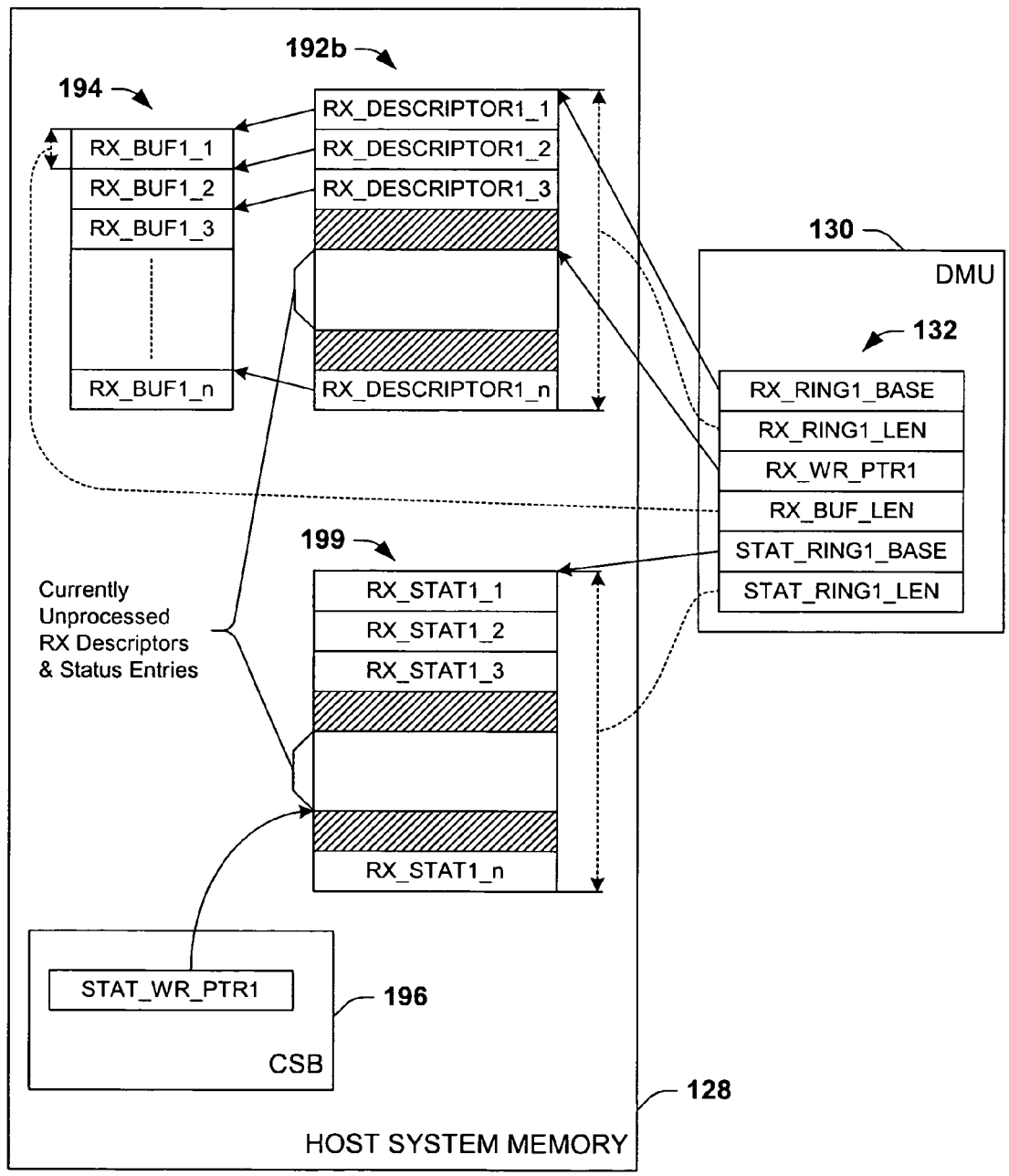

DESCRIPTOR MANAGEMENT SYSTEMS AND METHODS FOR TRANSFERRING DATA OF MULTIPLE PRIORITIES BETWEEN A HOST AND A NETWORK

RELATED APPLICATIONS

This application is related to U.S. patent application Ser. No. 10/676,758, filed on Oct. 1, 2003, entitled PERIPHERAL DEVICES AND METHODS FOR TRANSFERRING INCOMING DATA STATUS ENTRIES FROM A PERIPHERAL TO A HOST, and is also related to U.S. patent application Ser. No. 10/676,759 that has issued as U.S. Pat. No. 6,963,946, filed on Oct. 1, 2003, entitled DESCRIPTOR MANAGEMENT SYSTEMS AND METHODS FOR TRANSFERRING DATA BETWEEN A HOST AND A PERIPHERAL, the entirety of these applications being hereby incorporated by reference as if fully set forth herein.

FIELD OF INVENTION

The invention is generally related to the field of computer devices and more particularly to methods and systems for transferring data of multiple priorities between a host system and a network.

BACKGROUND OF THE INVENTION

Many computer systems, such as personal computers, often need to communicate and otherwise interact with external devices or systems, such as networks, printers, and other I/O devices. Peripheral systems, such as network interface controllers, I/O controllers, etc., are accordingly provided within the computer system to provide an interface between the host computer processor and the external devices. Such peripheral systems and other components are typically situated to transfer data via one or more buses, where the peripheral systems are typically cards or circuit boards in the host computer system. The host processor and the peripheral systems exchange data in order to facilitate interfacing software programs running in the host processor with external I/O, including networks.

Host-computing systems, such as personal computers, are often operated as nodes on a communications network, where each node is capable of receiving data from the network and transmitting data to the network. Data is transferred over a network in groups or segments, wherein the organization and segmentation of data are dictated by a network operating system protocol, and many different protocols exist. In fact, data segments that correspond to different protocols can co-exist on the same communications network. In order for a node to receive and transmit information packets, the node is equipped with a peripheral network interface controller, which is responsible for transferring information between the communications network and the host system. For transmission, the host processor constructs data or information packets in accordance with a network operating system protocol and passes them to the network peripheral. In reception, the host processor retrieves and decodes packets received by the network peripheral. The host processor performs many of its transmission and reception functions in response to instructions from an interrupt service routine associated with the network peripheral. When a received packet requires processing, an interrupt may be issued to the host system by the network peripheral. The interrupt has traditionally been issued after either all of the bytes in a packet or some fixed number of bytes in the packet have been received by the network peripheral.

Many computer systems include a peripheral bus, such as a peripheral component interconnect (PCI or PCI-X) bus for exchanging data between the host processor and high throughput devices, such as memory, network interfaces, display, and disk drives. The host processor and memory can be directly or indirectly connected to the PCI bus along with other devices, such as graphic display adapters, disk controllers, sound cards, etc., where such devices may be coupled directly or indirectly (e.g., through a host bridge) to the PCI or PCI-X bus. In other configurations, the peripheral systems and the main host system memory are connected to the PCI-X bus, wherein a peripheral system may operate as PCI-X bus master capable of direct memory access (DMA) operations to transfer data to and from the host memory. The host processor interacts with the PCI-X bus and main host system memory via a memory controller, and the host system may further include a cache memory for use by the host processor.

In conventional network interface controllers, packets of data frames sent from the host computer are transmitted to the network in the order they are received from the host. Also, data received by the network interface peripheral from the network is transferred to the host in the same order it was received. Transmit frames are prepared in the host system, typically by driver software components, that receive transmit requests from application software programs running in the host. Many different application software programs may concurrently require network support via the network interface peripheral, some of which may need to transmit more important data than do others. In some situations, transmission of less important data may restrict the flow of more important data to the network. Accordingly, there remains a need for improved data transfer methods and systems to facilitate improved quality of service in transferring data between a host computer and a network.

SUMMARY OF THE INVENTION

The following presents a simplified summary of the invention in order to provide a basic understanding of some aspects of the invention. This summary is not an extensive overview of the invention. It is intended neither to identify key or critical elements of the invention nor to delineate the scope of the invention. Rather, the primary purpose of this summary is to present some concepts of the invention in a simplified form as a prelude to the more detailed description that is presented later. The invention relates to methods and systems for transferring data of different priorities between a host and a network, which may be employed in transfer of transmit and/or receive data in a network controller or network interface peripheral. In other applications, the various aspects of the invention may be implemented in association with other types of peripheral devices, wherein the present invention is not limited to network peripherals.

One aspect of the invention provides a method for transferring data between a host and a network, in which data transfer queues or descriptor rings are provided in a shared memory, where the individual data transfer queues have a priority level. The queues can store one or more entries or descriptors associated with data to be transferred between the host and the network. The method further comprises transferring data in a prioritized fashion according to the priority levels of the queues, by transferring data associated with entries of higher priority queues before transferring data associated with entries of lower priority queues. In one implementation, receive data is transferred between the network and the host strictly based on the receive priority levels, in which lower priority data is read by the host only after all higher priority data has been read. Transmit data may be similarly transferred to the network, or a fairness algorithm may be employed, in which lower priority data is transferred to the network if a certain number of higher priority data frames have been transmitted, so that higher priority traffic does not completely block transmission of lower priority data.

Another aspect of the invention relates to systems for transferring data between a host and a network, comprising a plurality of data transfer queues in a shared memory and a network interface system coupled with the shared memory, the host, and the network. The individual data transfer queues may be descriptor rings holding one or more descriptors associated with data to be transferred between the host and the network. The network interface comprises a descriptor management system storing a plurality of priority levels that are individually associated with one of the data transfer queues. The network interface system transfers data associated with entries of higher priority data transfer queues before transferring data associated with entries of a given lower priority queue.

The following description and annexed drawings set forth in detail certain illustrative aspects and implementations of the invention. These are indicative of just a few of many ways in which the principles of the invention may be employed.

BRIEF DESCRIPTION OF THE DRAWINGS

FIG. 1H is a schematic diagram illustrating receive descriptor priority sources in the system of FIG. 1E;

FIG. 1I is a table illustrating receive priority selection in the system of FIG. 1E;

FIG. 1J is a schematic diagram illustrating a quality of service RAM in the descriptor management unit in the system of FIG. 1E;

FIG. 1K is a table illustrating an exemplary traffic class mapping in the descriptor management unit in the system of FIG. 1E;

FIG. 5G is a schematic diagram illustrating an exemplary receive descriptor in the network interface system of FIG. 2;

FIG. 5H is a schematic diagram illustrating an exemplary receive descriptor ring and receive status ring in host system memory, as well as pointer registers in the descriptor management unit of the network interface system of FIG. 2;

DETAILED DESCRIPTION OF THE INVENTION

Figure 1A:
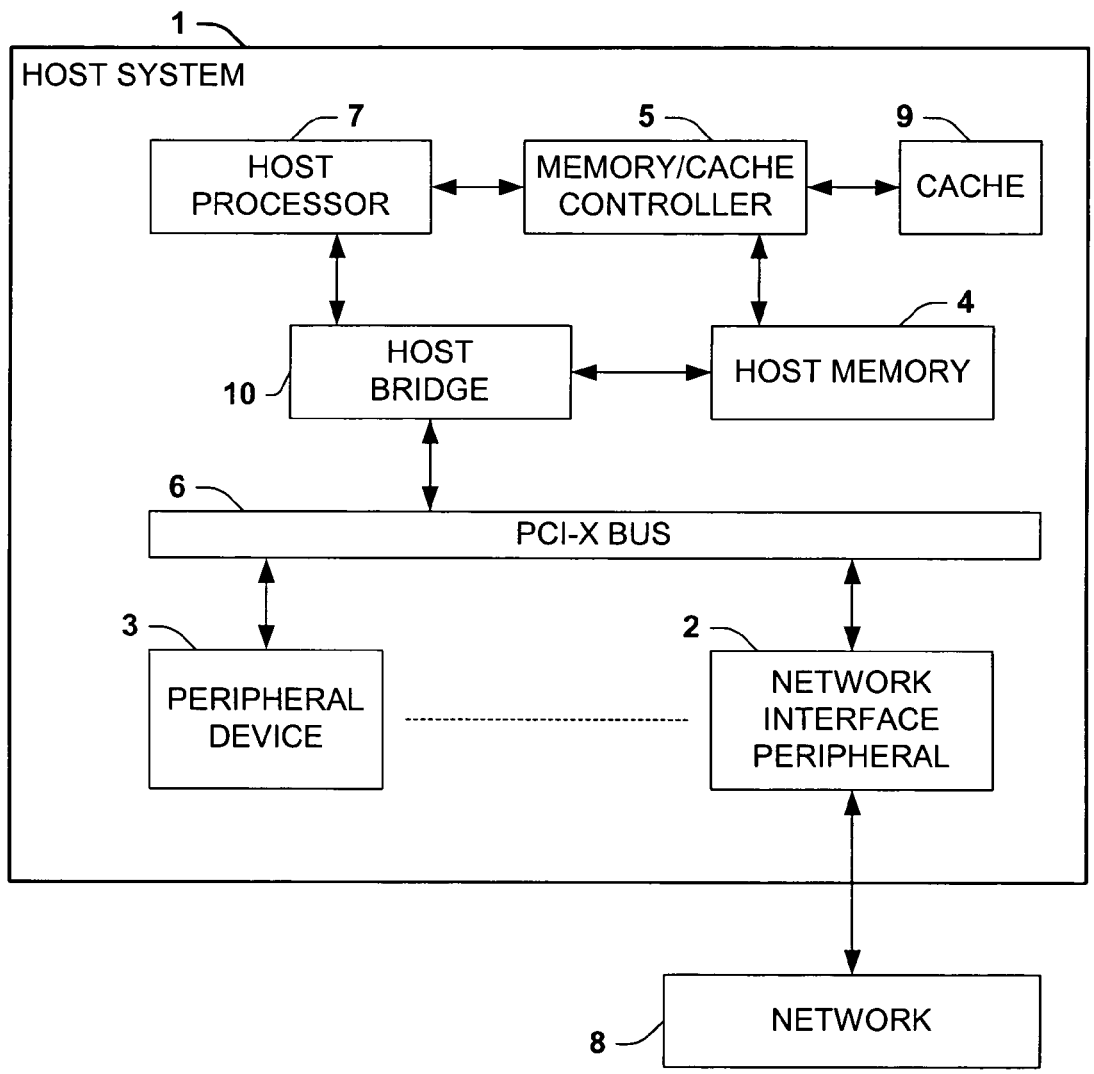
FIG. 1A is a schematic diagram illustrating an exemplary computer system having one or more peripheral devices in which one or more aspects of the present invention may be carried out.

One or more implementations of the present invention will now be described with reference to the drawings, wherein like reference numerals are used to refer to like elements throughout.

Figure 1B:
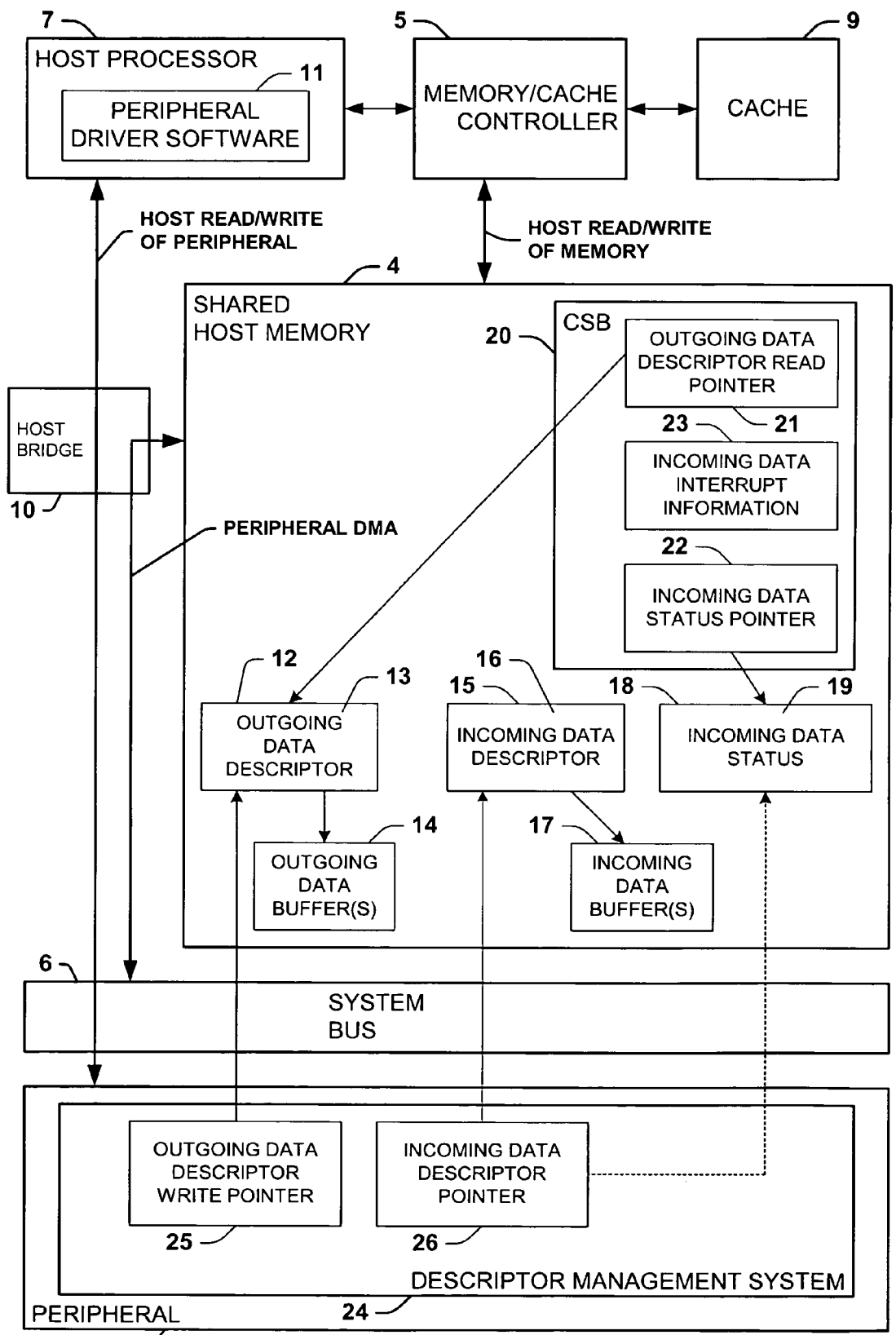
FIG. 1B is a schematic diagram illustrating an exemplary descriptor management system for facilitating communications between a host processor and a peripheral device in accordance with the invention.

Referring initially to FIGS. 1A and 1B, a host system 1 is illustrated, in which one or more of the aspects of the present invention may be carried out. The host system 1 comprises a PCI-X system bus 6 to which various components in the system are coupled, including a network peripheral 2 or other peripheral 3, a shared host main memory 4, a host bridge 10, and a memory/cache controller 5. The host bridge 10 interfaces the bus 6 with a host processor 7, which is also coupled with the shared memory 4 via the memory/cache controller 5 (FIG. 1B). The network peripheral 2 interfaces the host processor with an external network 8, such as a LAN or other type network, and one or more other peripherals 3 interface the host processor 7 with external devices (not shown). The host system 1 also comprises a cache memory 9, which may be operated as a write-back cache or a write-through cache for improving processor efficiency, wherein the memory controller 5 may also operate as a cache controller.

Several aspects of the invention are hereinafter illustrated and described in the context of the exemplary network interface peripheral 2, which may be implemented as a single chip network controller with various interface devices, connectors, power circuitry, etc. on a network interface card (NIC) coupled to the PCI-X bus 6 in the host system 1. However, the features of the invention are generally applicable to other types of peripherals, wherein the descriptor management aspects illustrated and described herein may be employed for exchanging data between any peripheral or network and a host such as the host processor 7. Further, the features of the invention may be employed in association with any host system in which any bus architecture, memory systems, and memory controllers are used. In this regard, all such applications and implementations are contemplated as falling within the scope of the invention and the appended claims.

As illustrated in FIG. 1B, the host processor comprises peripheral driver software 11, which may communicate with the shared memory 4 using the memory/cache controller 5 and the network peripheral 2 via the host bridge 10. The driver 11 provides interface functionality to interface the host processor 7 and other software running therein (e.g., upper layers in a network stack) with the network interface peripheral 2, which in turn, interfaces the driver 11 with an external network (e.g., network 8 of FIG. 1A). While the host processor 7 and the driver 11 may quickly communicate with the shared memory 4 via the memory controller 5 and/or the local bus 10, communication with the peripheral 2 via the system bus 6 is less efficient. Such communication is performed using I/O read and write operations, wherein I/O read operations are particularly costly in terms of processor efficiency since the host processor 7 must wait for a response by the peripheral 2.

The host system 1 includes a descriptor system for transferring incoming data from the peripheral 2 to the host processor 7 and the driver software 11 therein, and for transferring outgoing data from the host 7 to the peripheral 2 using the shared system memory 4. In the illustrated implementation, the descriptor system and the shared memory 4 are used primarily for transferring outgoing data from the driver 11 in the host 7 to the network peripheral 2 for transmission to the network 8 (FIG. 1A) and for transferring received data from the network 8 from the network peripheral 2 to the driver 11. However, the descriptor systems and methods of the invention may be employed for transferring any type of data between a host and a peripheral.

The exemplary descriptor system comprises data transfer queues including descriptor and status rings organized as contiguous blocks of memory locations or registers operated as circular memory rings in the shared memory 4, wherein the first location in the block is considered to follow the last register. The memory locations in a descriptor or status ring need not be contiguous and other configurations are possible within the scope of the present invention. An outgoing data (e.g., transmit) descriptor ring 12 in the shared memory stores outgoing data descriptors 13 indicating locations of outgoing data buffers 14, and an incoming data (e.g., receive) descriptor ring 15 stores incoming data descriptors 16 indicating locations of incoming data buffers 17 in the shared memory 4. An incoming (e.g., receive) data status ring 18 stores incoming data status entries 19 corresponding to incoming data in the incoming data buffers 17.

The descriptor system also provides a control status block (CSB) 20 in the shared memory 4. The CSB includes memory locations or registers in the shared memory 4, which the host 7 and the driver 11 therein can access using fast memory read operations. The CSB 20 comprises an outgoing data descriptor read pointer 21, which indicates a location of an outgoing data descriptor 13 in the outgoing data descriptor ring 12. The pointer 21 and other pointers in the present invention may be a physical address of one of a particular descriptor 13 in the ring 12, or may be an offset from the address of the first location in the ring 12, or any other value indicative of the particular descriptor 13. The outgoing data descriptor read pointer 21 indicates a number of outgoing data buffers 14 to which the host processor 7 or the driver 11 therein can write outgoing data. In one implementation illustrated and described below, the pointer 21 is written by the peripheral 2 to indicate a descriptor 13 in the ring 12 just beyond the last outgoing descriptor 13 that the peripheral has processed. In this example, the host 7 can proceed to fill outgoing data buffers 14 and corresponding descriptors 13 until the location of the descriptor identified by the pointer 21 without having to directly communicate with the peripheral 2.

With respect to incoming data, the CSB 20 further comprises an incoming data status pointer 22, which indicates a location of an incoming data status entry 19 in the incoming data status ring 18, as well as incoming data interrupt information 23. The incoming data status pointer 22 points to a particular status entry 19, such as by direct address or as an offset into the status ring 18, wherein the particular entry 19 addressed by the pointer 22 indicates a number of incoming data buffers 17 from which the host 7 or the driver 11 can read incoming data. In one example, the pointer 22 is written by the peripheral 2 to indicate a status entry 19 just past the last status entry 19 written by the peripheral. In this example, the host 7 and/or the driver 11 therein can proceed to process incoming data by reading the status ring entries 19 and the incoming data from the corresponding buffers 17 until the location of the descriptor identified by the pointer 22 without having to directly communicate with the peripheral 2. For incoming data, the peripheral 2 writes the incoming data interrupt information 23 to the CSB 20 and interrupts the host processor 7 to indicate that one or more incoming data status entries 19 and corresponding data in the buffers 17 are ready to be read by the host 7. The host 7, in turn, can read the interrupt information 23 upon being interrupted, without costly I/O reads to obtain this information from the peripheral 2. In this manner, the status pointer 22 and the interrupt information 23 allow the host to process incoming data using only fast memory read operations without direct intervention by the peripheral 2.

In the peripheral 2, a descriptor management system or unit (e.g., DMU) 24 is provided, which may comprise any suitable logic circuitry and memory registers in the peripheral 2. The descriptor management system 24 comprises an outgoing data descriptor write pointer 25 and an incoming data descriptor pointer 26, implemented as memory registers in the exemplary peripheral 2. The outgoing data descriptor write pointer 25 is written by the host processor 7 and indicates a location of an outgoing data descriptor 13 in the outgoing data descriptor ring 12 and indicates a number of outgoing data buffers 14 from which the peripheral 2 can read outgoing data. The incoming data descriptor pointer 26 is also written by the host 7 and indicates a location of an incoming data descriptor 16 in the incoming data descriptor ring 15, wherein the incoming data descriptor pointer 26 indicates a number of incoming data buffers 17 to which the peripheral 2 can write incoming data. In the exemplary peripheral 2, the incoming data descriptors 16 in the incoming data descriptor ring 15 may individually indicate the location of a plurality of incoming data buffers 17 in the shared memory 4 to reduce bus bandwidth usage.

With respect to outgoing data, the host processor 7 or the peripheral driver software 11 therein is adapted to read a current outgoing data descriptor read pointer 21 from the CSB 20, and to write outgoing data to one or more outgoing data buffers 14 according to the current outgoing data descriptor read pointer 21. The host 7 writes one or more outgoing data descriptors 13 to the outgoing data descriptor ring 12 according to the current outgoing data descriptor read pointer 21, and writes an updated outgoing data descriptor write pointer 25 to the descriptor management system 24 in the peripheral 2 according to the number of outgoing data buffers 14 to which outgoing data was written.

The peripheral 2 reads one or more outgoing data descriptors 13 from the descriptor ring 12 according to the updated outgoing data descriptor write pointer 25, and reads outgoing data from one or more outgoing data buffers 14 in accordance therewith. The peripheral 2 then writes an updated outgoing data descriptor read pointer 21 to the CSB 20 according to the number of outgoing data buffers 14 from which the peripheral 2 has read outgoing data. The updated outgoing data descriptor write pointer 25 in the descriptor management system 24 comprises an address in the shared memory 4 indicating a location in the outgoing data descriptor ring 12 just beyond the most recent outgoing data descriptor 13 written to the descriptor ring 12 by the host 7. The updated outgoing data descriptor read pointer 21 in the CSB 20 comprises an address in the memory 4 indicating a location in the outgoing data descriptor ring 12 just beyond the most recent outgoing data descriptor 13 read by the peripheral 2. In this manner, the outgoing data descriptor read pointer indicates a number of outgoing data buffers 14 to which the host 7 can write outgoing data, and the outgoing data descriptor write pointer 25 indicates a number of outgoing data buffers 14 from which the peripheral 2 can read outgoing data. Consequently, the peripheral 2 and the host 7 can proceed in generally autonomous fashion to transfer outgoing data from the host 7 to the peripheral 2, while mitigating excessive bus bandwidth usage.

For transfer of incoming data from the peripheral 2 to the host 7, the peripheral 2 reads one or more incoming data descriptors 16 from the incoming data descriptor ring 15 according to a current incoming data descriptor pointer 26. The peripheral 2 then writes incoming data to one or more incoming data buffers 17 according to the descriptors 13, and writes one or more incoming data status entries 19 in the incoming data status ring 18 according to the one or more incoming data descriptors 16. The peripheral 2 then writes an updated incoming data status pointer 22 to the CSB 20 according to the number of incoming data buffers 17 that were written by the peripheral 2.

The host 7 reads the updated incoming data status pointer 22 and reads one or more incoming data status entries 19 from the status ring 18 according to the updated pointer 22. The host 7 reads incoming data from one or more incoming data buffers 17 according to the updated pointer 22 and writes an updated incoming data descriptor pointer 26 to the descriptor management system 24 according to the number of incoming data buffers 17 from which the host 7 has read incoming data. In the exemplary descriptor system, the updated incoming data status pointer 22 in the CSB 20 comprises a memory address indicating a location in the incoming data status ring 18 just beyond the most recent incoming data status entry 19 written by the peripheral 2. The updated incoming data descriptor pointer 26 in the descriptor management system 24 of the peripheral 2 comprises a memory address indicating a location in the incoming data descriptor ring 15 just beyond the most recent incoming data descriptor 16 written by the host 7. In this manner, the incoming data status pointer 22 indicates the number of incoming data buffers 17 from which the host can read incoming data, and the incoming data descriptor pointer indicates a number of incoming data buffers 17 to which the peripheral 2 can write incoming data. In accordance with another aspect of the invention, the exemplary CSB 20 is smaller than a cache line size for the cache memory 9. Furthermore, the exemplary peripheral 2 updates the entire cache line containing the CSB 20 in the shared memory 4 in a single write operation, thereby reducing memory bandwidth usage and mitigating the number of cache line invalidations.

In accordance with the present invention, the exemplary descriptor system is configured to accommodate multiple quality of service (QOS) priority levels of incoming and/or outgoing data. In the exemplary system of FIGS. 1A and 1B, a plurality of outgoing data descriptor rings 12, incoming data descriptor rings 15, and incoming data status rings 18 are provided in the shared memory 4. Individual outgoing data descriptor rings 12 correspond to an outgoing data priority level and store outgoing data descriptors 13 indicating locations of outgoing data buffers 14 in the shared memory 4. With respect to incoming data, individual incoming data descriptor rings 15 correspond to incoming data priority levels and store incoming data descriptors 15 indicating locations of incoming data buffers 17 and individual incoming data status rings 18 are likewise associated with a corresponding incoming data priority, where the status rings 18 store incoming data status entries 19 accordingly. The incoming data descriptors 16, moreover, may each point to a plurality of incoming data buffers 17, wherein a corresponding plurality of status entries 19 are provided in the status rings 18.

For QOS support, the CSB 20 comprises a plurality of outgoing data descriptor read pointers 21 and a plurality of incoming data status pointers 22. Individual outgoing data descriptor read pointers 21 correspond to an outgoing data priority and indicate a number of outgoing data buffers to which the host can write outgoing data associated with the corresponding outgoing data priority. The individual incoming data status pointers 22 are likewise individually associated with a corresponding incoming data priority and indicate a number of incoming data buffers 17 from which the host 7 can read incoming data for the corresponding incoming data priority. In the peripheral 2, the descriptor management system 24 comprises a plurality of outgoing data descriptor write pointers 25 individually associated with a corresponding outgoing data priority, which indicate a number of outgoing data buffers 14 from which the peripheral 2 can read outgoing data for the corresponding outgoing data priority. In addition, the system 24 comprises a plurality of incoming data descriptor pointers 26, each associated with a corresponding incoming data priority. The pointers 26 individually indicate a number of incoming data buffers 17 to which the peripheral 2 can write incoming data for that priority.

Figure 1C:
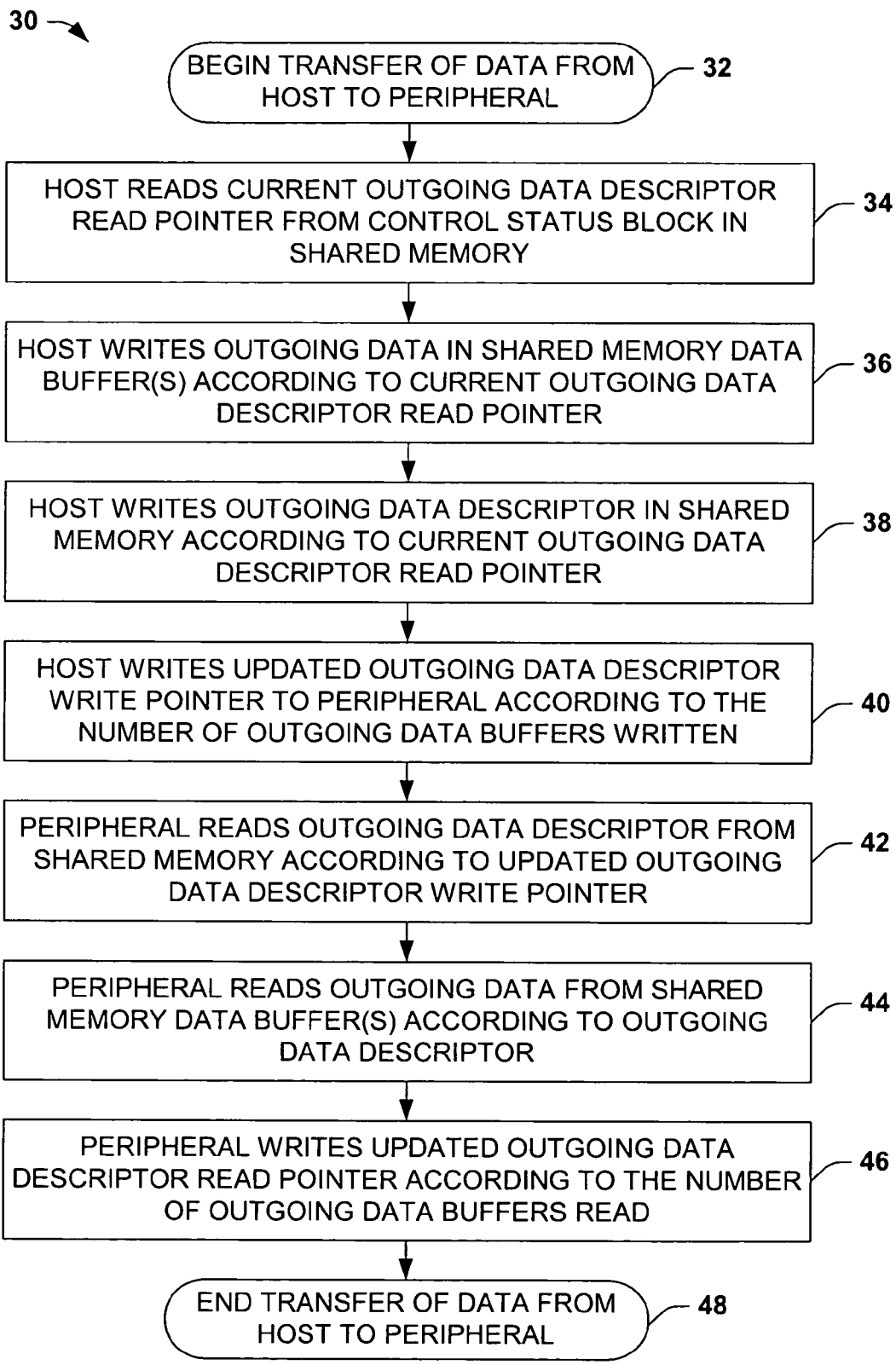
FIG. 1C is a flow diagram illustrating an exemplary method of transferring outgoing data from a host to a peripheral using a descriptor system in accordance with an aspect of the present invention.
Figure 1D:
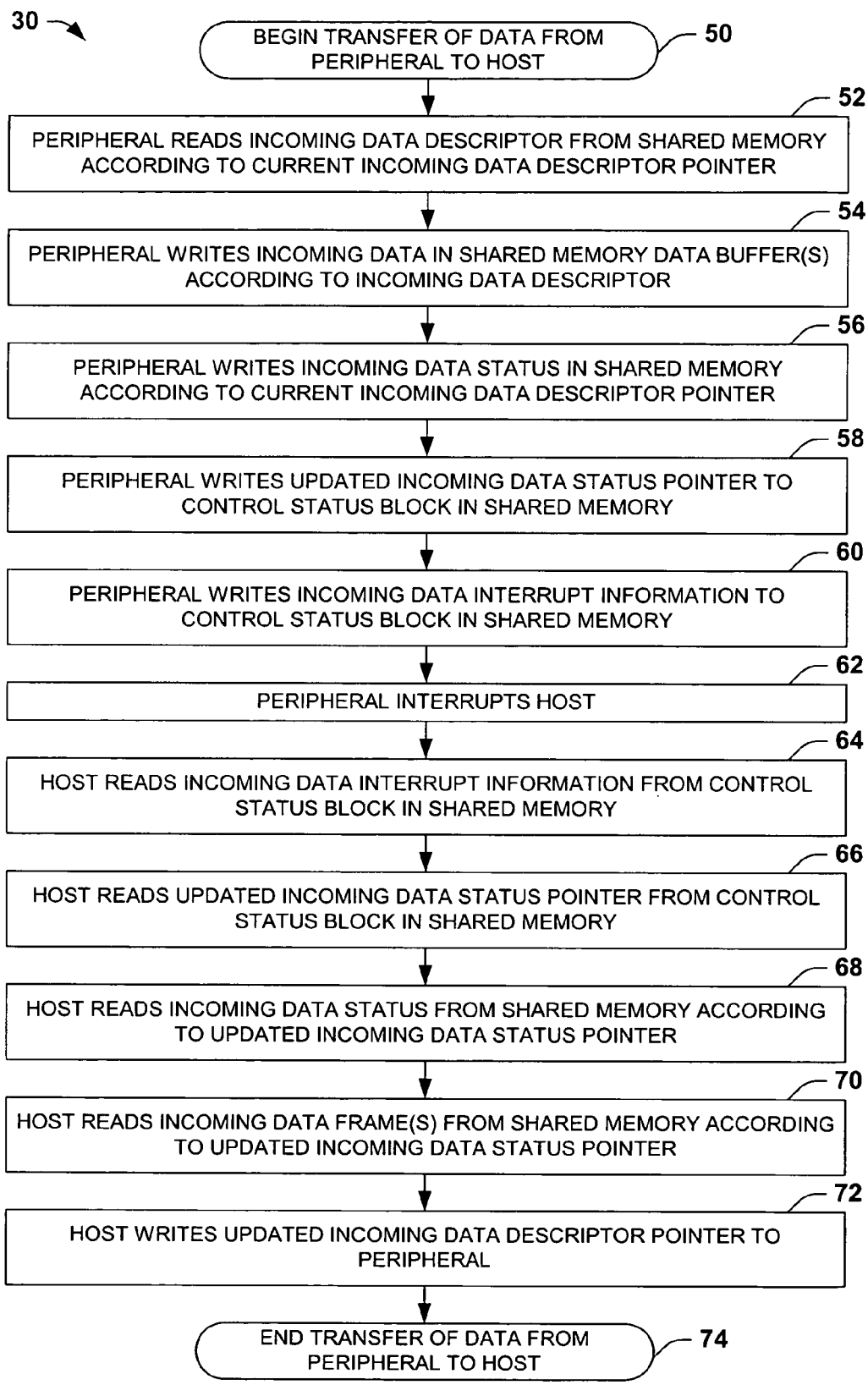
FIG. 1D is a flow diagram illustrating an exemplary method of transferring incoming data from a peripheral to a host using a descriptor system in accordance with the invention.

FIGS. 1C and 1D illustrate a method 30 showing the general operation for transferring incoming and outgoing data in the system of FIGS. 1A and 1B, via the host 7 (e.g., and/or the driver software 11 thereof) and the network interface peripheral 2 (e.g., and/or the descriptor management system 24 thereof). The operation illustrated in FIGS. 1C and 1D is also representative of the operation in the network controller 102 and the host processor 112 illustrated in FIGS. 1E, and 2-4 below. FIGS. 1F and 1G illustrate the priority arbitration for outgoing and incoming data in accordance with the invention. FIG. 1C illustrates transfer of outgoing data from a host (e.g., host 7 above or a driver 11 therein) to a peripheral (e.g., peripheral 2 above) using a descriptor system, and FIG. 1D illustrates transfer of incoming data from a peripheral to a host using a descriptor system. It is to be appreciated that the transfer of outgoing and incoming data between the host and the peripheral may occur concurrently, wherein the various aspects of the present invention allow the host and peripheral to operate generally independent of one another with respect to direct communication therebetween. In this regard, the acts or events illustrated in FIGS. 1C and 1D for transfer of outgoing and incoming data may occur contemporaneously, wherein no specific ordering is required by the invention.

With respect to outgoing data, the transfer operation begins at 32 in FIG. 1C, where the host reads a current outgoing data descriptor read pointer from a control status block (e.g., pointer 21 in CSB 20 above) at 34 and writes outgoing data to shared memory data buffers (e.g., buffers 14) in accordance therewith at 36. At 38, the host writes an outgoing data descriptor write pointer (e.g., pointer 25 in the peripheral 2 above) according to the number of outgoing buffers written by the host. At 42, the peripheral reads an outgoing data descriptor (e.g., descriptor 13 above) according to the updated outgoing data descriptor write pointer, and reads outgoing data from the buffers in accordance therewith at 44. At 46, the peripheral then writes an updated outgoing data descriptor read pointer (e.g., pointer 21 in the CSB 20) according to the number of outgoing data buffers read by the peripheral, whereafter the outgoing data transfer ends at 48. For QOS support in accordance with the present invention, the outgoing data flow proceeds generally as indicated in 34-46 above, with higher priorities generally being serviced first. In this regard, FIG. 1F illustrates the transmit priority arbitration for QOS support in accordance with the present invention, as described further below. For example, the peripheral 2 may suspend transfer of lower priority outgoing data until some or all higher priority data has been transferred. Transmit queues in the peripheral 2 are generally serviced in a strict priority basis (a low priority queue is not serviced until all higher priority rings have been serviced) except that the peripheral 2 may be programmed to prevent a continuous stream of high priority traffic from completely blocking all lower priority traffic (e.g., using a fairness algorithm) as discussed below with respect to FIG. 1F.

FIG. 1D illustrates transfer of incoming data from the peripheral to the host beginning at 50, with the peripheral reading an incoming data descriptor (e.g., descriptor 16 above) from the shared memory according to a current incoming data descriptor pointer at 52 (e.g., pointer 26 above), and writing incoming data into the shared memory buffers (e.g., buffers 17 above) at 54 according to the incoming data descriptor. FIG. 1G illustrates the receive priority arbitration of the present invention, as described further below. An individual incoming data descriptor may be associated with a plurality of incoming data buffers, whereby the peripheral need not read a separate incoming data descriptor for every frame it transfers to the host. At 56, the peripheral writes incoming data status entries into the shared memory (e.g., status entries 19 in the status ring 18 above) according to the current incoming data descriptor pointer, wherein a plurality of status entries may correspond with a single incoming data descriptor. The peripheral then writes incoming data interrupt information to the CSB at 60 and interrupts the host at 62.

At 64, the host reads the incoming data interrupt information from the CSB, to service the peripheral interrupt without having to perform an I/O read to obtain the information. The host also reads an updated incoming data status pointer from the CSB at 66 and reads incoming data status from the status ring in the shared memory at 68 according to the updated incoming data status pointer. At 70, the host reads one or more incoming data frames from the shared memory according to the updated incoming data status pointer and writes an updated incoming data descriptor pointer to the peripheral at 72 before the incoming data processing ends at 74. For multi-level priority (e.g., QOS) support, the incoming data flow proceeds generally as indicated in 52-72 above, with a host software driver determining the order of incoming data processing by reading the data from higher priority queues before reading lower priority data. In the above method 30, moreover, it will be appreciated that the operations of the host and the peripheral for both incoming and outgoing data transfer may occur concurrently. For example, the peripheral may be transferring incoming data to the shared memory while the host is reading incoming data from another part of the shared memory within the scope of the invention.

Figure 1E:
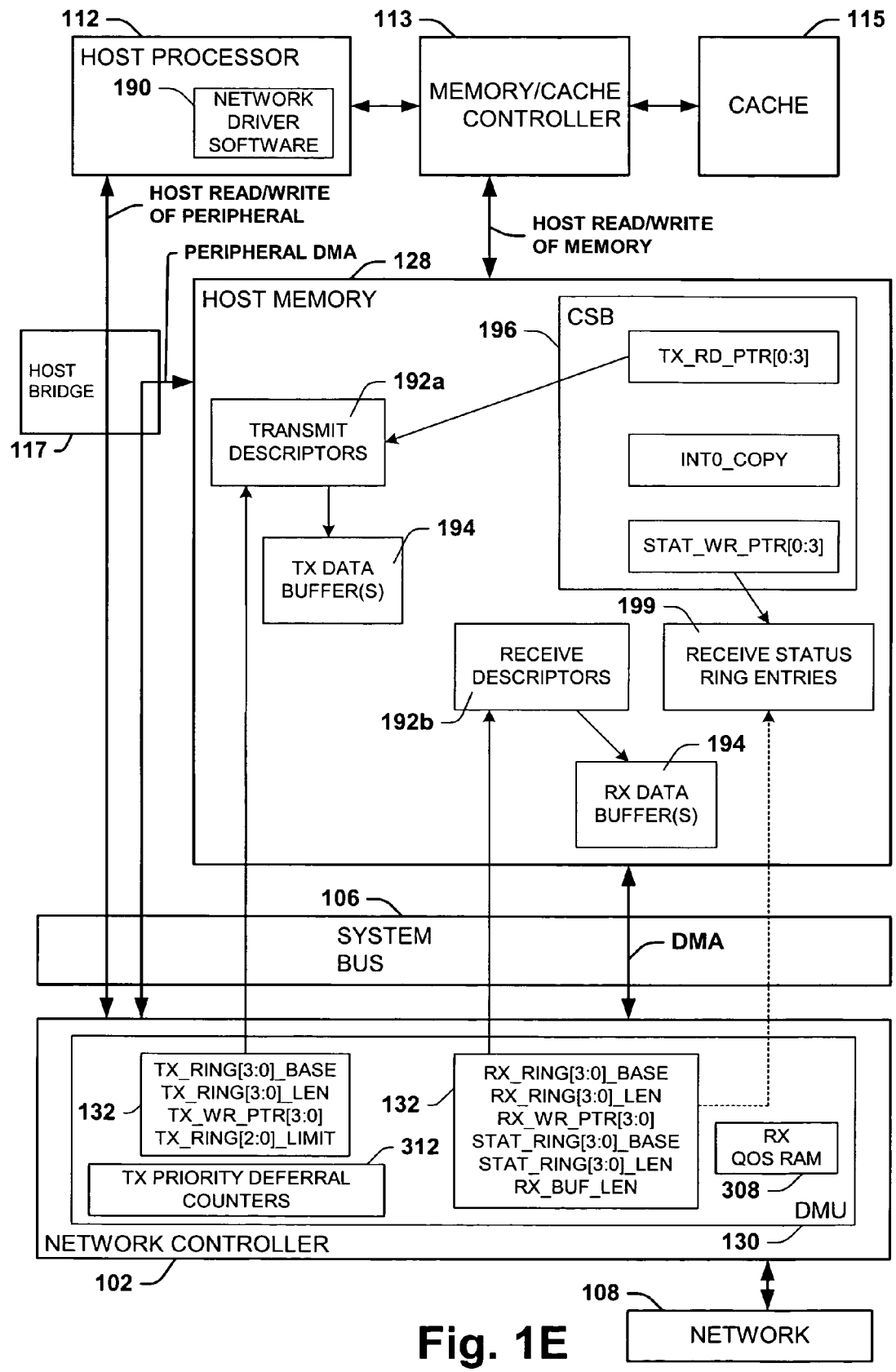
FIG. 1E is a schematic diagram illustrating an exemplary network interface peripheral system for interfacing a host system with a processor including a descriptor management system in accordance with the invention.
Figure 1F:
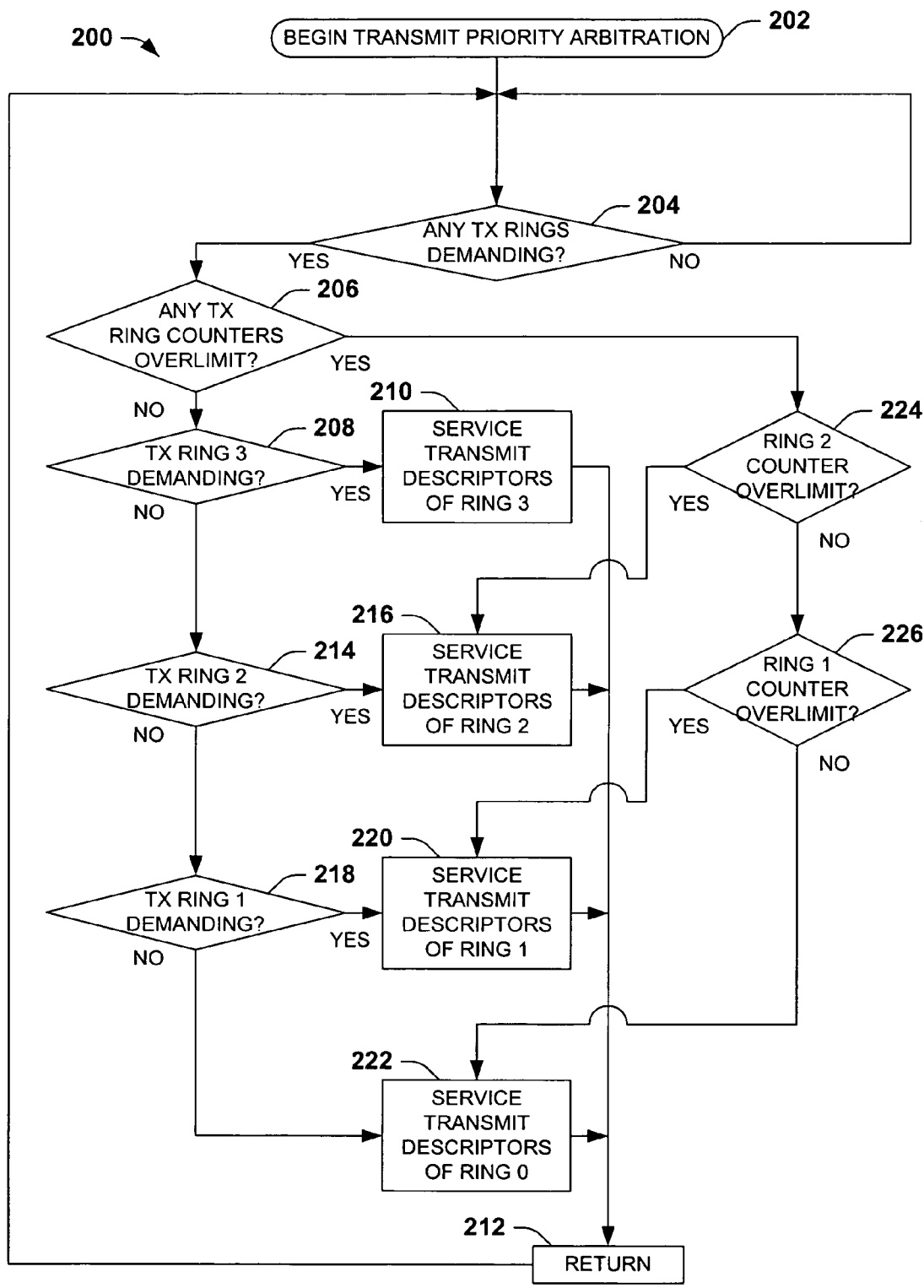
FIG. 1F is a flow diagram illustrating priority arbitration in the descriptor management system for multiple priority transmit descriptor rings in the system of FIG. 1E in accordance with an aspect of the present invention.
Figure 1G:
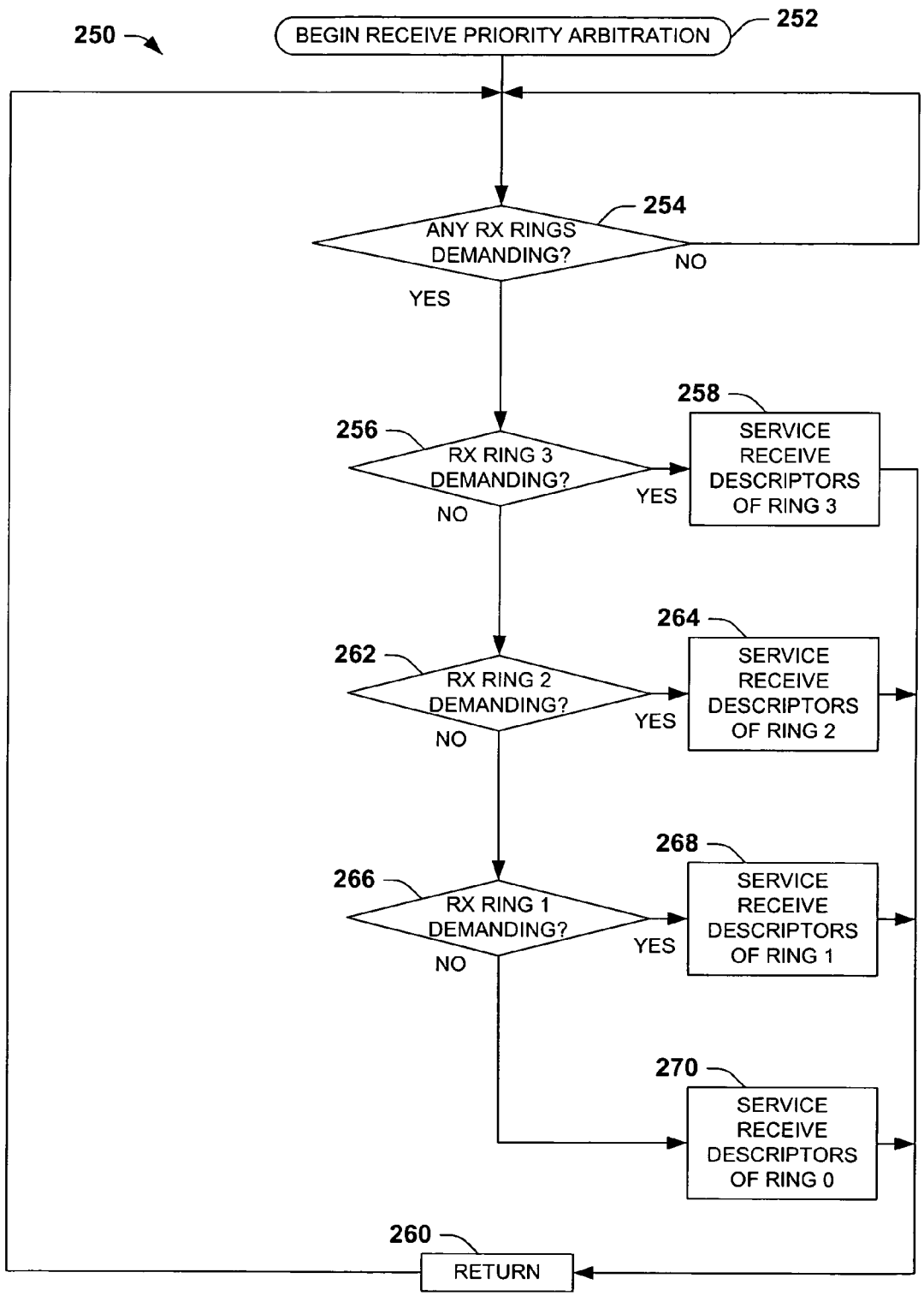
FIG. 1G is a flow diagram illustrating priority arbitration in the descriptor management system for multiple priority receive descriptor rings in the system of FIG. 1E in accordance with the present invention.

Referring now to FIGS. 1E-1K and 2-4, the invention is exemplified in a descriptor system provided in an exemplary network interface controller peripheral 102 and a network driver 190 running in a host processor 112 for transferring data (e.g., transmit and receive data) using a shared host memory 128 as illustrated and described hereinafter. As shown in FIG. 1E, the host processor 112 may locally access the shared memory 128 and a cache memory 115 via a memory/cache controller 113 and may communicate directly with the network controller 102 via I/O read and write operations across a system bus 106 using a host bridge 117, for example, where the exemplary system bus 106 is a PCI-X bus. The host memory 112 includes a control status block (CSB) 196, transmit/receive data buffers 194, as well as descriptor locations for transmit descriptors 192a, receive descriptors 192b, and receive status entries 199.

Quality of Service Priority Operation

In accordance with the present invention, the exemplary network controller 102 provides hardware support for four transmitter queues and four receiver data transfer queues to implement up to 4 levels of priority. Associated with each controller hardware queue is a separate data transfer queue or descriptor ring in host system memory 128. In addition, the shared memory 128 also stores a separate receive status ring for each receiver queue. The host 112 assigns priority to a transmitted frame simply by setting up a descriptor (or descriptors) 192a in the appropriate transmit descriptor ring. For a received frame, the DMU 130 directs the frame to the appropriate queue based on information that it reads from frame headers. Transmit queues are serviced by the controller 102 in a strict priority basis (a low priority ring is not serviced until all higher priority rings have been serviced), except that there is a mechanism that can be programmed to prevent a continuous stream of high priority traffic from completely blocking all lower priority traffic. Received data in this example is read by the host 112 from the shared memory 128 on a strictly priority basis.

As shown in FIG. 1E, the CSB 196 includes an outgoing data descriptor read pointer TX_RD_PTR for each of four transmit (Tx) data priority (QOS) levels, a copy of the peripheral interrupt information INT0_COPY, as well as an incoming data status pointer STAT_WR_PTR for each of four receive (Rx) data priority levels.

The controller 102 comprises a descriptor management unit or system (DMU) 130 having various registers 132 for storage of pointers and related information by the host 112. As illustrated and described further below, the DMU registers 132 include transmit descriptor base pointers TX_RING[3:0]_BASE for storing the memory addresses of the start of the transmit descriptor rings of the corresponding QOS priority level, and the lengths of the transmit descriptor rings are provided in TX_RING[3:0]_LEN registers. Transmit descriptor write pointers are stored in registers TX_WR_PTR [3:0], where the driver software 190 updates these registers to point just beyond the last QWORD that the driver 190 has written to the corresponding transmit descriptor ring. The DMU registers 132 also include threshold value registers TX_RING[2:0]_LIMIT used in arbitrating transmit priority in accordance with the present invention. The DMU 130 also includes transmit priority deferral counters 312 associated with all but the highest priority transmit descriptor ring (e.g., priority levels 0-2 in the illustrated implementation).

Receive descriptor base pointers RX_RING[3:0]_BASE include the address of the start of the receive descriptor rings of corresponding priority, and the lengths of these receive descriptor rings are provided in RX_RING[3:0]_LEN registers 132. Receive descriptor write pointers RX_WR_PTR[3:0] are updated by the driver 190 to point just beyond the last QWORD that the driver has written to the corresponding receive descriptor ring. Receive status ring base pointer registers STAT_RING[3:0]_BASE indicate the address of the receive status rings, and STAT_RING[3:0]_LEN indicate the lengths of the corresponding receive status rings. A buffer length register RX_BUF_LEN indicates the number of QWORDS of the receive data buffers 194, where all the receive data buffers 194 are of the same length, and a CSB address register CSB_ADDR indicates the address of the CSB 196 in the host memory 128. For quality of service priority, the DMU 130 also comprises a receive QOS RAM 308, as illustrated and described below with respect to FIG. 1J.

Referring now to FIG. 1F, transmit priority arbitration is illustrated in an exemplary method 200 in accordance with the present invention. The arbitration method 200 is carried out in the network controller 102 to determine which data is to be sent from the shared memory 128 to the network 108. Transmit priority arbitration begins at 202, and a determination is made at 204 as to whether any transmit descriptor rings require service (e.g., whether any outgoing data has been stored by the host 112 in the shared memory 128 for transmission to the network 108). In the exemplary controller 102, the DMU 130 compares the transmit write pointer registers TX_WR_PTR[3:0] 132 (FIG. 1E) with the values of the corresponding TX_RD_PTR[3:0] most recently written to the CSB 196 in the shared memory 128. If the contents of one of the TX_WR_PTR[3:0] registers differ form the contents of the corresponding TX_RD_PTR[3:0] register, that descriptor ring is demanding service. If so, (YES at 204), a determination is made by the DMU 130 at 206 as to whether any of the transmit ring counters 312 are overlimit (e.g., greater than or equal to a corresponding threshold or limit values stored in the TX_RING[2:0]_LIMIT registers 132 in FIG. 1E).

If not (NO at 206), the method 200 proceeds according to strict priority to transmit data associated with lower priority transmit descriptor rings only after all higher priority data has been transmitted. In this case, the DMU 130 makes a determination at 208 as to whether the highest priority transmit descriptor requires servicing (e.g., whether TX descriptor ring 3 is demanding service). If so, (YES at 208), one or more transmit descriptors associated with ring 3 are serviced at 210, and the method 200 returns at 212 for further arbitration at 204. Servicing of the priority level 3 transmit descriptor ring by the controller 102 proceeds at 210 generally as described at 42-46 in FIG. 1C above, with the network controller 102 providing the priority level 3 transmit data to the network 108 (e.g., with or without intervening security processing), and incrementing the counters 312 associated with lower priority transmit descriptor rings for each data frame transmitted at 210.

Where no counters 312 are overlimit and no priority 3 transmit descriptors need servicing (e.g., NO at 208), the method 200 proceeds to 214, whereat the DMU 130 determines whether any priority level 2 transmit descriptors require servicing. If so (e.g., YES at 214), these are processed by the controller 102 at 216 (e.g., as described at 42-46 in FIG. 1C above). Also at 216, the DMU 130 clears the level 2 counter 312 and if priority level 1 or 0 transmit queue is requesting service, it increments the corresponding transmit priority deferral counter 312 or counters 312. The method 200 then returns through 212 and 204 as described above. In the case where no counters 312 are overlimit and no priority 3 or 2 transmit descriptors need servicing (e.g., NO at 214), the DMU 130 determines at 218 whether any priority level 1 transmit descriptors require servicing. If so, (YES at 218), these are processed at 220, with the transmit priority deferral counter for level 1 being cleared. If the priority level 0 transmit queue is requesting service, the transmit priority deferral counter 0 is incremented. After servicing the level 1 transmit descriptors in step 220, the method 200 then returns through 212 and 204. If no counters are overlimit and only priority level 0 transmit descriptors are pending (e.g., NO at 218), the controller 102 processes these and clears the level 0 counter at 222 before returning at 212 and 204.

For transmit arbitration, the exemplary DMU 130 employs the priority deferral counters 312 and the threshold values stored in the TX_RING[2:0]_LIMIT registers 132 to ensure that higher priority traffic does not completely prevent lower priority data from being transmitted. The threshold values in the TX_RING[2:0]_LIMIT registers 132 are provided by the host 112 in the exemplary implementation, although these can be fixed or may be dynamically adjusted. Whenever transmit descriptors of any priority are to be serviced (e.g., YES at 204), the DMU 130 compares each counter 312 with the corresponding threshold value or limit in the TX_RING[2:0]_LIMIT registers 132 at 206, to determine whether any transmit priority deferral counters 312 are overlimit. If so (e.g., YES at 206), the data associated therewith will be transmitted despite the presence of higher priority data requiring transmission.

The DMU 130 determines at 224 whether the counter corresponding to the priority 2 transmit descriptor ring is overlimit (e.g., the value of the level 2 counter 312 is greater than or equal to the corresponding threshold value in the TX_RING2_LIMIT register 132. If so, (YES at 224), the priority level 2 data is processed at 216 as described above, with the level 2 counter being cleared. If the level 1 transmit queue is requesting service, the counter for level 1 is incremented. If the level 0 transmit queue is requesting service, the counter for level 0 is incremented. If not (e.g., NO at 224), the DMU 130 determines at 226 whether the level 1 counter 312 is overlimit (e.g., the value of the level 1 counter 312 is greater than or equal to the corresponding threshold value in the TX_RING1_LIMIT register 132. If so, (YES at 226), the level 1 data is processed at 220 as described above, the counter 312 for level 0 is incremented if the level 1 frame transmit queue is requesting service, and the level 1 counter is cleared. If not (e.g., NO at 226), the pending level 0 outgoing data is processed at 222 as described above and the counter 312 for level 0 is cleared.

The transmit arbitration thus provides for generally strict prioritization of the order of transmitted frames according to the particular transmit descriptors employed by the host 112, with the caveat that the counters 312 and limit registers 132 can be employed to prevent low priority data from being totally or substantially blocked from transmission to the network 108. In another possible implementation, transmit operation can instead be strictly based on priority level, wherein the counters 312 and the TX_RING[2:0]_LIMIT registers 132 are not used. Moreover, while the illustrated example employs four transmit priority (e.g., QOS) levels, any number of such levels may be used within the scope of the invention.

Referring now to FIG. 1G, receive priority arbitration (e.g., incoming data) is illustrated in an exemplary method 250 in accordance with the present invention. The arbitration method 250 is carried out in the host 112, for example, in the driver 190 running therein to determine which received data is to be read from the shared memory 128. In another aspect of the invention, the descriptor management system 130 in the network controller 102 assigns the received data to one of the four different receive descriptor rings using the receive descriptors therein according to the data itself using the receive QOS RAM 308, as described further below with respect to FIGS. 1H-1K. The host 112 then reads the data from the shared memory 128 for a particular priority level generally according to 64-72 in FIG. 1D above.

Beginning at 252 in FIG. 1G, the host 112 determines at 254 whether any receive descriptors require service (e.g., whether any incoming data has been stored by the controller 102 in the shared memory 128). In the exemplary implementation, the host gets an interrupt from the controller 102 (e.g., 62 in FIG. 1D) and reads the INT_COPY word in the CSB 20. If any receive descriptors need servicing, (YES at 254), the host determines at 256 whether any of the highest priority data (e.g., level 3) is ready to be read. If so (YES at 256), the host 112 reads these at 258 and updates the RX_WR_PTR3 pointer in the DMU registers 132 (e.g., generally per 70 and 72 in FIG. 1D above), before returning at 260.

If no level 3 data is ready (NO at 256), the host 112 determines at 262 whether any of the priority level 2 data is ready to be read. If so (YES at 262), the host 112 reads these at 264 and updates the RX_WR_PTR2 pointer in the DMU registers 132 before returning at 260. In the case where no level 2 or 3 data is to be read (NO at 262), the host 112 determines at 266 whether any level 1 data is pending. If so (YES at 266), these are read from the shared memory 128 at 268 and the host 112 updates the RX_WR_PTR1 pointer register 132. If only level 0 receive data is pending (NO at 266), these are read at 270 and the host 112 updates the RX_WR_PTR0 pointer register 132. Thus, strict priority is followed in processing receive data in the illustrated implementation. Other implementations are possible within the scope of the invention, for example, wherein receive data is processed in similar fashion to the transmit data, using generally strict priority with provisions (e.g., counters and threshold values) to ensure that lower priority data is not completely blocked.

Referring also to FIGS. 1H-1K, the exemplary DMU 130 determines the priority of the incoming data based on the data itself, and stores received data and status entries 199 therefor in the shared memory 128. Upon receiving a frame from the network 108, the controller 102 assigns the frame to one of the four receive priority levels based on the contents of the 802.1Q VLAN/Priority Tag (PRI in the Qtag 300 of FIG. 1H), the DiffServe Codepoint (DSCP) data in the Type of Service field in the IPv4 header 302, or the Traffic Class field of the IPv6 header 304 of the received frame. To accommodate possible changes in standards and usage, the mapping from these fields to priority queues is done via programmable tables in the one internal 32×32 bit receive QOS RAM 308 (FIG. 1J), which are loaded by the driver software 190 at initialization.

In assigning the receive priority, the source of the priority information in the frame is initially determined by parsing the received frame, and the priority information from the frame is mapped into a priority queue. If the IP header 302 is used, and the IP version is 4 (IPv4), the priority information is found in the 6 most significant bits of the Type of Service Field. If the IP version is 6 (IPv6), the priority information comes from the 8-bit Traffic Class Field in the IPv6 header 304. The presence of a QTag in a received frame is indicated by contents of the 802.3 Length/Type field at offset 12 from the start of the MAC header. If this field has the value 8100h, the four bytes starting at offset 12 are interpreted as a 32-bit QTag 300 in FIG. 1H. Bits 15-13 of the QTag 300 are the User Priority Field used to select one of eight 2-bit entries in the lower half of word 14H (e.g., of the VLAN QTAG data in FIG. 1J). If the frame contains an IP packet, the four most significant bits of the first 32-bit word of the IP Header indicate the IP version number (e.g., 4 or 6). For IPv4, bits 23-16 of this word make up the Type of Service Field in the header 302, wherein the 6 most significant bits of this field are interpreted as a DiffServe Code Point (DSCP). For IPv6, bits 27-20 of the first 32-bit word in the header 304 make up the Traffic Class Field.

As illustrated in a table 306 in FIG. 1I, the choice of QTag or IP header depends on programmable PREF_QTAG and ALT_PRI_OK bits in the DMU registers 132, which are set by the host 112 at initialization. If the PREF_QTAG bit is set, the Qtag field is the preferred source of priority information. If the PREF_QTAG bit is 0, the IP header is the preferred source of priority information. In this case if IP header exists, the priority will be derived from the IP header. The programmable ALT_PRI_OK bit is used to determine the source of priority information if the preferred source is not present in the received frame. If ALT_PRI_OK is set and the preferred source of priority is not present, the priority is obtained from the alternate source, if the alternate source is present. If neither a QTag field nor an IP header is present in a received frame the frame is assigned to a programmable default priority, which is stored in a Default Priority Register 132 in the DMU 130. Once the source of the priority information is chosen, the output queue number is read from one of three tables in the receive QOS RAM 308 of FIGS. 1E and 1J, wherein FIG. 1K illustrates an example priority source mapping 310 for the RAM 308. In this mapping, if the source of the priority information is the QTag 300, the 3-bit User Priority Field of the QTag is used to select the output queue number from 8×2 bit VLAN QTag data in the RAM 308. If the source is the IPv4 header 302, the six most significant bits of the Type of Service Field of the IP header (DSCP) are used to select the output queue number from the 64×2 bit DSCP Map Table in the RAM 308. If the source is the IPv6 header 304, the 8-bit Traffic Class Field of the IPv6 header are used to select the output queue number from the 256×2 bit Traffic Class portion of the RAM 308.

As illustrated in FIGS. 1J and 1K, the Traffic Class Map Table occupies words 0-0F H in the RAM 308, the DSCP Map Table occupies words 10H-13H, and the Qtag Map Table occupies the 16 low-order bits of word 14H. Each 32-bit word in the RAM 308 holds 16 2-bit entries, wherein the contents of the 2-bit entry indicate the priority ring that the priority source maps to. The low-order 4 bits of the priority source (Traffic Class, DSCP, or Qtag Priority) are used to select one of the 16 entries. Thus, for example, a DSCP field value of 000000 B selects bits [1:0] of word 10H in the RAM 308, 000001 B selects bits [3:2], and 000010 B selects bits [5:4], etc., wherein FIG. 1K illustrates further exemplary mappings.

Figure 2:
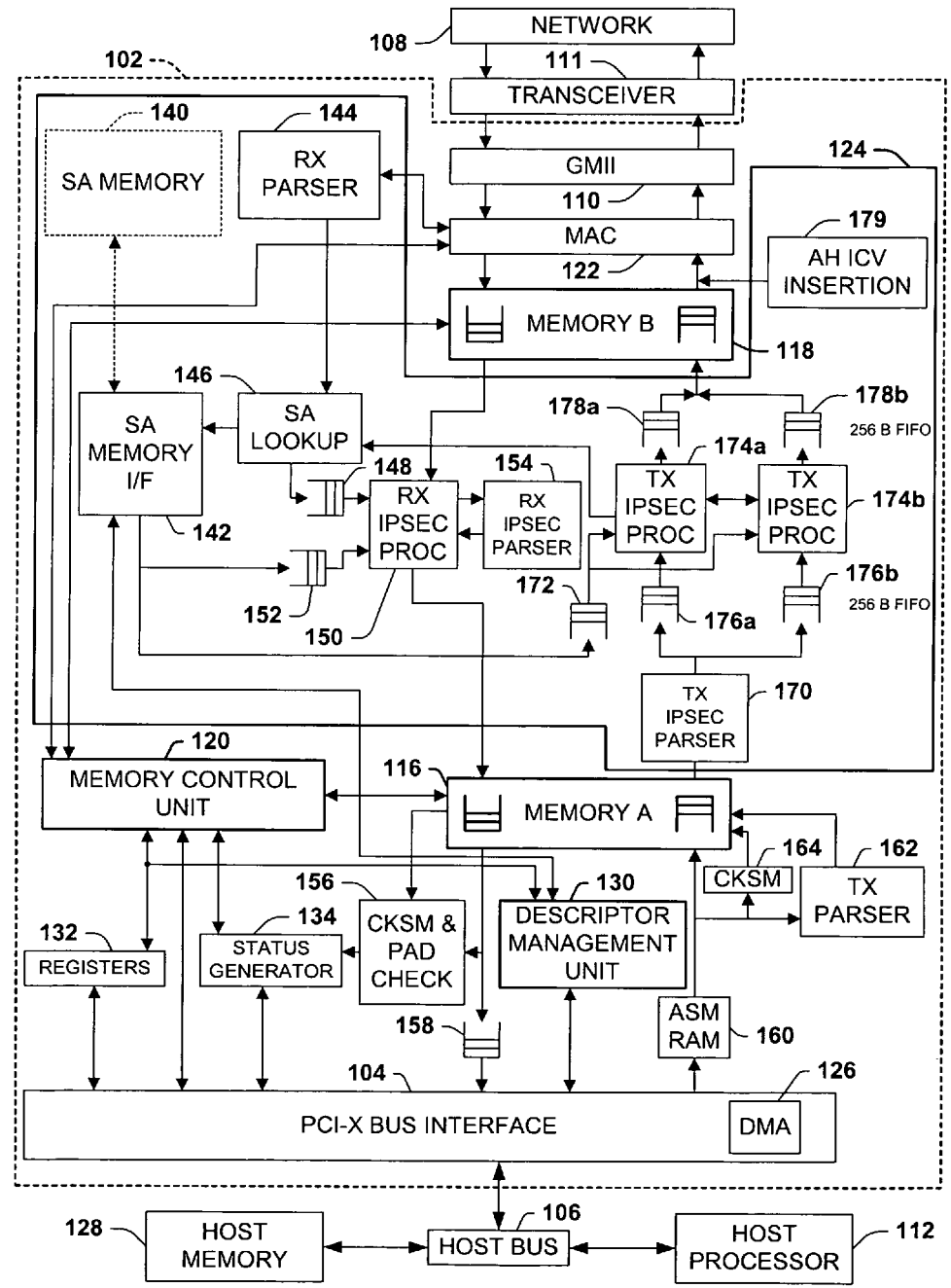
FIG. 2 is a schematic diagram further illustrating the exemplary network interface peripheral system in which various aspects of the invention may be carried out.
Figure 3:
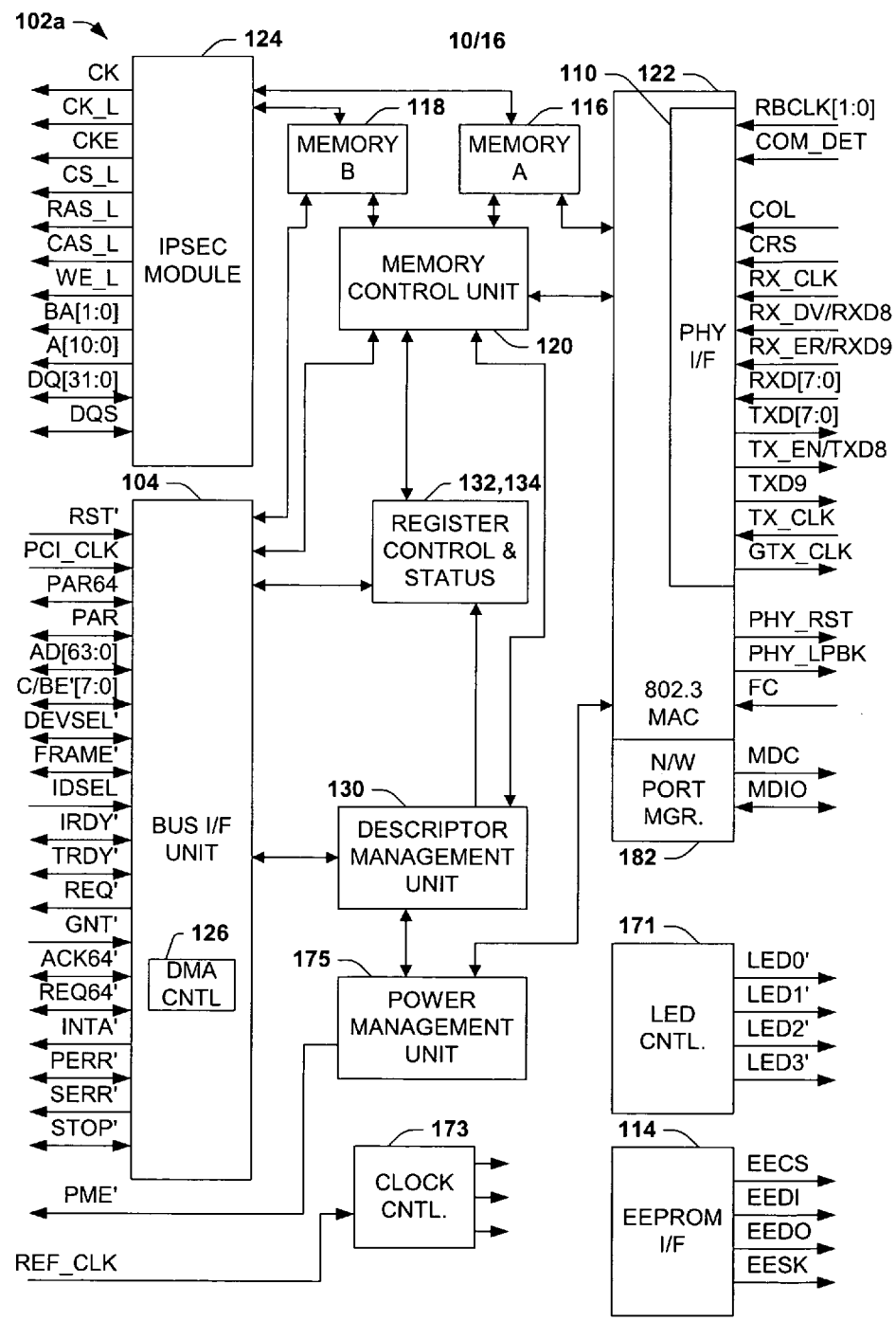
FIG. 3 is a schematic diagram illustrating an exemplary single-chip network controller implementation of the network interface system of FIG. 2.
Figure 4:
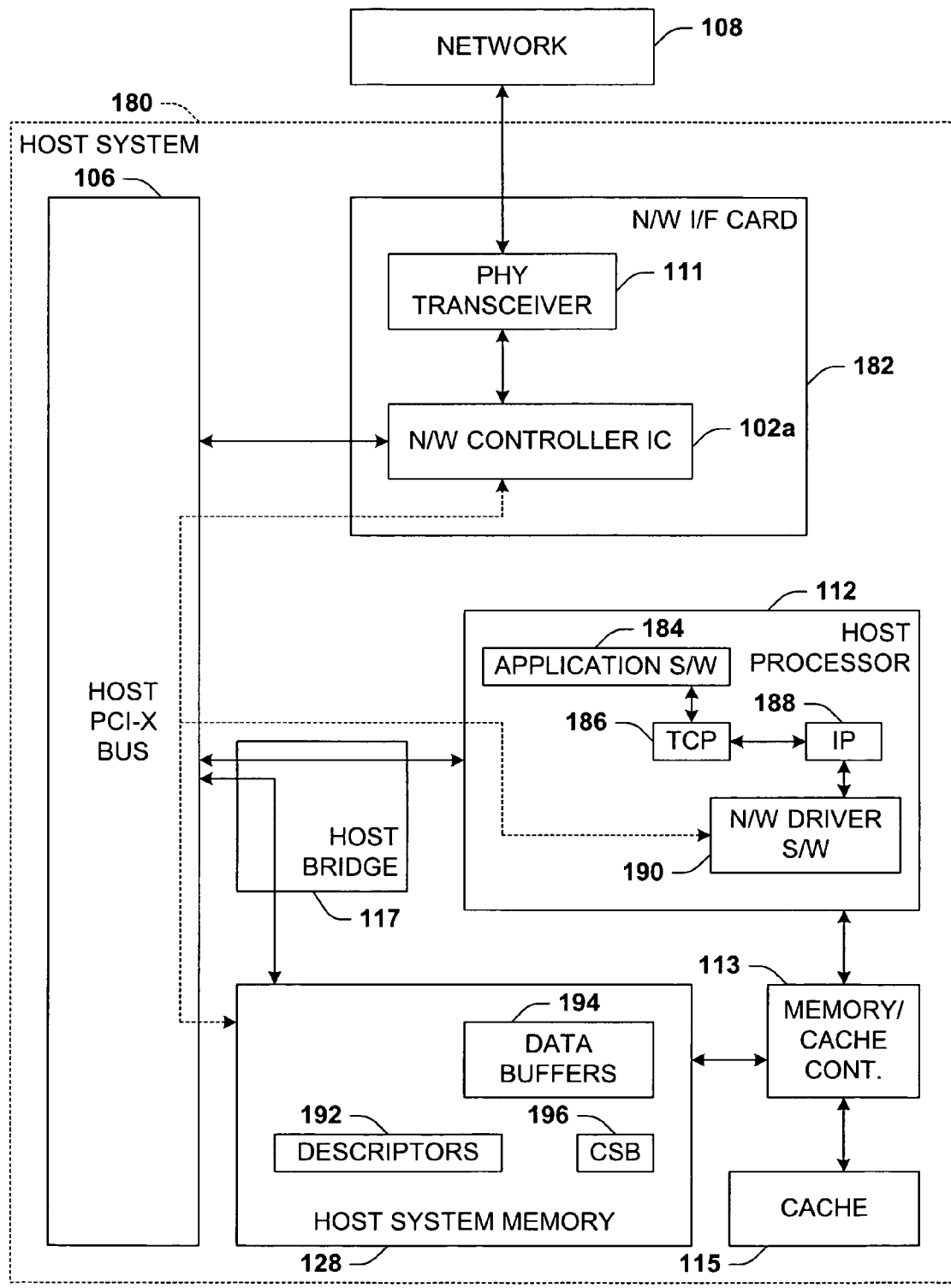
FIG. 4 is a schematic diagram illustrating a host system interfacing with a network using the exemplary network controller of FIG. 3.

FIG. 2 further illustrates the network interface peripheral system or network controller 102, and FIGS. 3 and 4 illustrate an exemplary single-chip implementation 102a of the network controller 102. The exemplary single-chip network controller 102a includes all the functionality and components described herein with respect to the network interface system 102. The various blocks, systems, modules, engines, etc. described herein may be implemented using any appropriate analog and/or digital circuitry, wherein one or more of the blocks, etc. described herein may be combined with other circuitry in accordance with the invention.

The network controller 102 includes a 64-bit PCI-X bus interface 104 for connection with a host PCI or PCI-X bus 106 that operates at a clock speed up to 133 MHz in PCI-X mode or up to 66 MHz in standard PCI mode. The network controller 102 may be operated as a bus master or a slave. Much of the initialization can be done automatically by the network controller 102 when it reads an optional EEPROM (not shown), for example, via an EEPROM interface 114 (FIG. 3). The network controller 102 can be connected to an IEEE 802.3 or proprietary network 108 through an IEEE 802.3-compliant Media Independent Interface (MII) or Gigabit Media Independent Interface (GMII) 110, for interfacing the controller 102 with the network 108 via an external transceiver device 111. For 1000 Mb/s operation the controller 102 supports either the byte-wide IEEE 802.3 Gigabit Media Independent Interface (GMII) for 1000BASE-T PHY devices 111 or the IEEE 802.3 Ten-Bit Interface (TBI) for 1000BASE-X devices 111. The network controller 102 supports both half-duplex and full-duplex operation at 10 and 100 Mb/s rates and full-duplex operation at 1000 Mb/s.

A host device, such as a host processor 112 on the host PCI-X bus 106 in a host system 180, may interface with the network controller 102 via the bus 106 and the host bridge 117. The host processor 112 includes one or more processors that can operate in a coordinated fashion. Referring also to FIG. 4, the single-chip network controller 102a may be provided on a network interface card or circuit board 182, together with a PHY transceiver 111 for interfacing the host processor 112 with the network 108 via the host bridge 117, the host bus 106, and the transceiver 111. The PCI-X bus interface 104 includes PCI configuration registers used to identify the network controller 102a to other devices on the PCI bus and to configure the device. Once initialization is complete, the host processor 112 has direct access to the I/O registers of the network controller 102 for performance tuning, selecting options, collecting statistics, and starting transmissions through the host bridge 117 and the bus 106. The host processor 112 is operatively coupled with the host system memory 128 and a cache memory 115 via a memory/cache controller 113. One or more application software programs 184 executing in the host processor 112 may be provided with network service via layer 4 (e.g., transport layer) software, such as transmission control protocol (TCP) layer software 186, layer 3 (e.g., network layer) software 188, such as internet protocol (IP) software 188, and a software network driver 190, also running on the host processor 112. As discussed below, the network driver software 190 interacts with the host memory 128 and the network controller 102 to facilitate data transfer between the application software 184 and the network 108.

As illustrated in FIG. 2, the exemplary network controller 102 comprises first and second internal random access memories MEMORY A 116 and MEMORY B 118, organized as first-in first-out (FIFO) memories for storage of frames. A memory control unit 120 is provided for control and operation of the memories 116 and 118. The network controller 102 also comprises a media access control (MAC) engine 122 satisfying requirements for operation as an Ethernet/IEEE 802.3-compliant node and providing the interface between the memory 118 and the GMII 110. The MAC engine 122 may be operated in full or half-duplex modes. An Internet Protocol Security (IPsec) engine 124 coupled with the memories 116 and 118 provides authentication and/or encryption functions.

The PCI-X bus interface 104 includes a Direct Memory Access (DMA) controller 126 that automatically transfers network frame data between the network controller 102 and buffers in host system memory 128 via the host bus 106. The operation of the DMA controller 126 is directed by a descriptor management unit 130 according to data structures called descriptors 192, which include pointers to one or more data buffers 194 in system memory 128, as well as control information. The descriptors 192 are stored in the host system memory 128 in queues called descriptor rings. Four transmit descriptor rings are provided for transmitting frames and four receive descriptor rings for receiving frames, corresponding to four priorities of network traffic in the illustrated controller 102. Additionally, four receive status rings are provided, one for each priority level, that facilitate synchronization between the network controller 102 and the host system. Transmit descriptors 192 control the transfer of frame data from the system memory 128 to the controller 102, and receive descriptors 192 control the transfer of frame data in the other direction. In the exemplary controller 102, each transmit descriptor 192 corresponds to one network frame, whereas each receive descriptor 192 corresponds to one or more host memory buffers in which frames received from the network 108 can be stored.

The software interface allocates contiguous memory blocks for descriptors 192, receiver status, and data buffers 194. These memory blocks are shared between the software (e.g., the network driver 190) and the network controller 102 during normal network operations. The descriptor space includes pointers to network frame data in the buffers 194, the receiver status space includes information passed from the controller 102 to the software in the host 112, and the data buffer areas 194 for storing frame data that is to be transmitted (e.g., outgoing data) and for frame data that has been received (e.g., incoming data).

Synchronization between the controller 102 and the host processor 112 is maintained by pointers stored in hardware registers 132 in the controller 102, pointers stored in a controller status block (CSB) 196 in the host system memory 128, and interrupts. The CSB 196 is a block of host system memory 128 that includes pointers into the descriptor and status rings and a copy of the contents of the controller's interrupt register. The CSB 196 is written by the network controller 102 and read by the host processor 112. Each time the software driver 190 in the host 112 writes a descriptor or set of descriptors 192 into a descriptor ring, it also writes to a descriptor write pointer register in the controller 102. Writing to this register causes the controller 102 to start the transmission process if a transmission is not already in progress. Once the controller has finished processing a transmit descriptor 192, it writes this information to the CSB 196. After receiving network frames and storing them in receive buffers 194 of the host system memory 128, the controller 102 writes to the receive status ring and to a write pointer, which the driver software 190 uses to determine which receive buffers 194 have been filled. Errors in received frames are reported to the host memory 128 via a status generator 134.

The IPsec module or engine 124 provides standard authentication, encryption, and decryption functions for transmitted and received frames. For authentication, the IPsec module 124 implements the HMAC-MD5-96 algorithm defined in RFC 2403 (a specification set by the Internet Engineering Task Force) and the HMAC-SHA-1-96 algorithm defined in RFC 2404. For encryption, the module implements the ESP DES-CBC (RFC 2406), the 3DES-CBC, and the AES-CBC encryption algorithms. For transmitted frames, the controller 102 applies IPsec authentication and/or encryption as specified by Security Associations (SAs) stored in a private local SA memory 140, which are accessed by IPsec system 124 via an SA memory interface 142. SAs are negotiated and set by the host processor 112. SAs include IPsec keys, which are required by the various authentication, encryption, and decryption algorithms, IPsec key exchange processes are performed by the host processor 112. The host 112 negotiates SAs with remote stations and writes SA data to the SA memory 140. The host 112 also maintains an IPsec Security Policy Database (SPD) in the host system memory 128.

A receive (RX) parser 144 associated with the MAC engine 122 examines the headers of received frames to determine what processing needs to be done. If it finds an IPsec header, it uses information contained in the header, including a Security Parameters Index (SPI), an IPsec protocol type, and an IP destination address to search the SA memory 140 using SA lookup logic 146 and retrieves the applicable security association. The result is written to an SA pointer FIFO memory 148, which is coupled to the lookup logic 146 through the SA memory interface 142. The key corresponding to the SA is fetched and stored in RX key FIFO 152. A receive (RX) IPsec processor 150 performs the processing requires by the applicable SA using the key. The controller 102 reports what security processing it has done, so that the host 112 can check the SPD to verify that the frame conforms with policy. The processed frame is stored in the memory 116.

A receive IPsec parser 154, associated with IPsec processor 150, performs parsing that cannot be carried out before packet decryption. Some of this information is used by a receive (Rx) checksum and pad check system 156, which computes checksums specified by headers that may have been encrypted and also checks pad bits that may have been encrypted to verify that they follow a pre-specified sequence for pad bits. These operations are carried out while the received frame is passed to the PCI-X bus 104 via FIFO 158. The checksum and pad check results are reported to the status generator 134.

In the transmit path, an assembly RAM 160 is provided to accept frame data from the system memory 128, and to pass the data to the memory 116. The contents of a transmit frame can be spread among multiple data buffers 194 in the host memory 128, wherein retrieving a frame may involve multiple requests to the system memory 128 by the descriptor management unit 130. These requests are not always satisfied in the same order in which they are issued. The assembly RAM 160 ensures that received chunks of data are provided to appropriate locations in the memory 116. For transmitted frames, the host 112 checks the SPD (IPsec Security Policy Database) to determine what security processing is needed, and passes this information to the controller 102 in the frame's descriptor 192 in the form of a pointer to the appropriate SA in the SA memory 140. The frame data in the host system memory 128 provides space in the IPsec headers and trailers for authentication data, which the controller 102 generates. Likewise, space for padding (to make the payload an integral number of blocks) is provided when the frame is stored in the host system memory buffers 194, but the pad bits are written by the controller 102.

As the data is sent out from the assembly RAM 160, it passes also into a first transmit (TX) parser 162, which reads the MAC header, the IP header (if present), the TCP or UDP header, and determines what kind of a frame it is, and looks at control bits in the associated descriptor. In addition, the data from the assembly RAM 160 is provided to a transmit checksum system 164 for computing IP header and/or TCP checksums, which values will then be inserted at the appropriate locations in the memory 116. The descriptor management unit 130 sends a request to the SA memory interface 142 to fetch an SA key, which is then provided to a key FIFO 172 that feeds a pair of TX IPsec processors 174a and 174b. Frames are selectively provided to one of a pair of TX IPsec processors 174a and 174b for encryption and authentication via TX IPsec FIFOs 176a and 176b, respectively, wherein a transmit IPsec parser 170 selectively provides frame data from the memory 116 to a selected one of the processors 174. The two transmit IPsec processors 174 are provided in parallel because authentication processing cannot begin until after encryption processing is underway. By using the two processors 174, the speed is comparable to the receive side where these two processes can be carried out simultaneously.

Authentication does not cover mutable fields, such as occur in IP headers. The transmit IPsec parser 170 accordingly looks for mutable fields in the frame data, and identifies these fields to the processors 174a and 174b. The output of the processors 174a and 174b is provided to the second memory 118 via FIFOs 178a and 178b, respectively. An Integrity Check Value (ICV), which results from authentication processing, is inserted into the appropriate IPsec header by an insertion unit 179 as the frame data is passed from the memory 118 to the MAC engine 122 for transmission to the network 108.

In the single-chip implementation of FIG. 3, the controller 102a comprises a network port manager 182, which may automatically negotiate with an external physical (PHY) transceiver via management data clock (MDC) and management data I/O (MDIO) signals. The network port manager 175 may also set up the MAC engine 122 to be consistent with the negotiated configuration. Circuit board interfacing for LED indicators is provided by an LED controller 171, which generates LED driver signals LED0'-LED3' for indicating various network status information, such as active link connections, receive or transmit activity on the network, network bit rate, and network collisions. Clock control logic 173 receives a free-running 125 MHz input clock signal as a timing reference and provides various clock signals for the internal logic of the controller 102a.

A power management unit 188, coupled with the descriptor management unit 130 and the MAC engine 122, can be used to conserve power when the device is inactive. When an event requiring a change in power level is detected, such as a change in a link through the MAC engine 122, the power management unit 188 provides a signal PME' indicating that a power management event has occurred. The external serial EEPROM interface 114 implements a standard EEPROM interface, for example, the 93Cxx EEPROM interface protocol. The leads of external serial EEPROM interface 114 include an EEPROM chip select (EECS) pin, EEPROM data in and data out (EEDI and EEDO, respectively) pins, and an EEPROM serial clock (EESK) pin.

In the bus interface unit 104, address and data are multiplexed on bus interface pins AD[63:0]. A reset input RST' may be asserted to cause the network controller 102a to perform an internal system reset. A cycle frame I/O signal FRAME' is driven by the network controller when it is the bus master to indicate the beginning and duration of a transaction, and a PCI clock input PCI_CLK is used to drive the system bus interface over a frequency range of 15 to 133 MHz on the PCI bus (e.g., host bus 106). The network controller 102a also supports Dual Address Cycles (DAC) for systems with 64-bit addressing, wherein low order address bits appear on the AD[31:0] bus during a first clock cycle, and high order bits appear on AD[63:32] during the second clock cycle. A REQ64' signal is asserted by a device acting as bus master when it wants to initiate a 64-bit data transfer, and the target of the transfer asserts a 64-bit transfer acknowledge signal ACK64' to indicate that it is willing to transfer data using 64 bits. A parity signal PAR64 is an even 8 byte parity signal that protects AD[63:32] The bus master drives PAR64 for address and write data phases and the target drives PAR64 for read data phases.

The network controller 102*a* asserts a bus request signal REQ' to indicate that it wishes to become a bus master, and a bus grant input signal GNT' indicates that the access to the bus has been granted to the network controller. An initialization device select input signal IDSEL is used as a chip select for the network controller during configuration read and write transactions. Bus command and byte enable signals C/BE[7:0] are used to transfer bus commands and to indicate which physical bytes of data lines AD[63:0] carry meaningful data. A parity I/O signal PAR indicates and verifies even parity across AD[31:0] and C/BE[3:0].

The network controller drives a drive select I/O signal DEVSEL' when it detects a transaction that selects the network controller 102*a* as a target. The network controller 102*a* checks DEVSEL' to see if a target has claimed a transaction that the network controller initiated. TRDY' is used to indicate the ability of the target of the transaction to complete the current data phase, and IRDY' indicates the ability of the initiator of the transaction to complete the current data phase. Interrupt request output signal INTA' indicates that one or more enabled interrupt flag bits are set. The network controller 102*a* asserts a parity error I/O signal PERR' when it detects a data parity error, and asserts a system error output signal SERR' when it detects an address parity error. In addition, the controller 102*a* asserts a stop I/O signal STOP' to inform the bus master to stop the current transaction.

In the MAC engine 122, a physical interface reset signal PHY_RST is used to reset the external PHY 111 (MII, GMII, TBI), a PHY loop-back output PHY_LPBK is used to force an external PHY device 111 into loop-back mode for systems testing, and a flow control input signal FC controls when the MAC transmits a flow control frame. The network controller 102*a* provides an external PHY interface 110 that is compatible with either the Media Independent Interface (M11), Gigabit Media Independent Interface (GMII), or Ten Bit Interface (TBI) per IEEE Std 802.3. Receive data input signals RXD[7:0] and output signals TXD[7:0] are used for receive and transmit data exchange, respectively. When the network controller 102*a* is operating in GMII or MII mode, TX_EN/TXD[8] is used as a transmit enable. In TBI mode, this signal is bit 8 of the transmit data bus. RX_DV/RXD[8] is an input used to indicate that valid receive data is being presented on the RX pins. In TBI mode, this signal is bit 8 of the receive data bus.

When the network controller 102*a* is operating in GMII or MII mode, RX_ER/RXD[9] is an input that indicates that the external transceiver device has detected a coding error in the receive frame currently being transferred on the RXD pins. In TBI mode, this signal is bit 9 of the receive data bus. MII transmit clock input TX_CLK is a continuous clock input that provides the timing reference for the transfer of the TX_EN and TXD[3:0] signals out of the network controller 102*a* in MII mode. GTX_CLK is a continuous 125 MHz clock output that provides the timing reference for the TX_EN and TXD signals from the network controller when the device is operating in GMII or TBI mode. RX_CLK is a clock input that provides the timing reference for the transfer of signals into the network controller when the device is operating in MII or GMII mode. COL is an input that indicates that a collision has been detected on the network medium, and a carrier sense input signal CRS indicates that a non-idle medium, due either to transmit or receive activity, has been detected (CRS is ignored when the device is operating in full-duplex mode). In TBI mode, 10-bit code groups represent 8-bit data packets. Some 10-bit code groups are used to represent commands. The occurrence of even and odd code groups and special sequences called commas are all used to acquire and maintain synchronization with the PHY 110. RBCLK[0] is a 62.5 MHz clock input that is used to latch odd-numbered code groups from the PHY device, and RBCLK[1] is used to latch even-numbered code groups. RBCLK[1] is always 180 degrees out of phase with respect to RBCLK[0]. COM_DET is asserted by an external PHY 111 to indicate the code group on the RXD[9:0] inputs includes a valid comma.

The IPsec module 124 includes an external RAM interface to memories 116 and 118. When CKE is driven high, an internal RAM clock is used to provide synchronization, otherwise the differential clock inputs CK and CK_L are used. The RAM's have a command decoder, which is enabled when a chip select output CS_L is driven low. The pattern on the WE_L, RAS_L, and CAS_L pins defines the command that is being issued to the RAM. Bank address output signals BA[1:0] are used to select the memory to which a command is applied, and an address supplied by RAM address output pins A[10:0] selects the RAM word that is to be accessed. A RAM data strobe I/O signal DQS provides the timing that indicates when data can be read or written, and data on RAM data I/O pins DQ[31:0] are written to or read from either memory 116 or 118.

Returning again to FIG. 2, an operational discussion of receive and transmit operation of the network controller 102 is provided below. Starting with receipt of a data frame from the network media 108 (e.g., an optical fiber), the frame is delivered to the GMII 110 (the Gigabit Media-Independent Interface), for example, as a series of bytes or words in parallel. The GMII 110 passes the frame to the MAC 122 according to an interface protocol, and the MAC 122 provides some frame management functions. For example, the MAC 122 identifies gaps between frames, handles half duplex problems, collisions and retries, and performs other standard Ethernet functions such as address matching and some checksum calculations. The MAC 122 also filters out frames, checks their destination address and accepts or rejects the frame depending on a set of established rules.

The MAC 122 can accept and parse several header formats, including for example, IPv4 and IPv6 headers. The MAC 122 extracts certain information from the frame headers. Based on the extracted information, the MAC 122 determines which of several priority queues (not shown) to put the frame in. The MAC places some information, such as the frame length and priority information, in control words at the front of the frame and other information, such as whether checksums passed, in status words at the back of the frame. The frame passes through the MAC 122 and is stored in the memory 118 (e.g., a 32 KB RAM). In this example, the entire frame is stored in memory 118. The frame is subsequently downloaded to the system memory 128 to a location determined by the descriptor management unit 130 according to the descriptors 192 in the host memory 128 (FIG. 4), wherein each receive descriptor 192 comprises a pointer to a data buffer 194 in the system memory 128. Transmit descriptors include a pointer or a list of pointers, as will be discussed in greater detail supra. The descriptor management unit 130 uses the DMA 126 to read the receive descriptor 192 and retrieve the pointer to the buffer 194. After the frame has been written to the system memory 128, the status generator 134 creates a status word and writes the status word to another area in the system memory 128, which in the present example, is a status ring. The status generator 134 then interrupts the processor 112. The system software (e.g., the network driver 190 in FIG. 4) can then check the status information, which is already in the system memory 128. The status information includes, for example, the length of the frame, what processing was done, and whether or not the various checksums passed.

In transmit operation, the host processor 112 initially dictates a frame transmission along the network 108, and the TCP layer 186 of the operating system (OS) in the host processor 112 is initiated and establishes a connection to the destination. The TCP layer 186 then creates a TCP frame that may be quite large, including the data packet and a TCP header. The IP layer 188 creates an IP header, and an Ethernet (MAC) header is also created, wherein the data packet, and the TCP, IP, and MAC headers may be stored in various locations in the host memory 128. The network driver 190 in the host processor 112 may then assemble the data packet and the headers into a transmit frame, and the frame is stored in one or more data buffers 194 in the host memory 128. For example, a typical transmit frame might reside in four buffers 194: the first one containing the Ethernet or MAC header, the second one having the IP header, the third one the TCP header, and the fourth buffer containing the data. The network driver 190 generates a transmit descriptor 192 that includes a list of pointers to all these data buffers 194.

The frame data is read from the buffers 194 into the controller 102. To perform this read, the descriptor management unit 130 reads the transmit descriptor 192 and issues a series of read requests on the host bus 106 using the DMA controller 126. However, the requested data portions may not arrive in order they were requested, wherein the PCI-X interface 104 indicates to the DMU 130 the request with which the data is associated. Using such information, the assembly RAM logic 160 organizes and properly orders the data to reconstruct the frame, and may also perform some packing operations to fit the various pieces of data together and remove gaps. After assembly in the assembly RAM 160, the frame is passed to the memory 116 (e.g., a 32 KB RAM in the illustrated example). As the data passes from the assembly RAM 160, the data also passes to the TX parser 162. The TX parser 162 reads the headers, for example, the MAC headers, the IP headers (if there is one), the TCP or UDP header, and determines what kind of a frame it is, and also looks at the control bits that were in the associated transmit descriptor 192. The data frame is also passed to the transmit checksum system 164 for computation of TCP and/or IP layer checksums.

The transmit descriptor 192 may comprise control information, including bits that instruct the transmit checksum system 164 whether to compute an IP header checksum and/or TCP checksum. If those control bits are set, and the parser 162 identifies or recognizes the headers, then the parser 162 tells the transmit checksum system 164 to perform the checksum calculations, and the results are put at the appropriate location in the frame in the memory 116. After the entire frame is loaded in the memory 116, the MAC 122 can begin transmitting the frame, or outgoing security processing (e.g., encryption and/or authentication) can be performed in the IPsec system 124 before transmission to the network 108.

By offloading the transmit checksumming function onto the network controller 102, the host processor 112 is advantageously freed from that task. In order for the host processor 112 to perform the checksum, significant resources must be expended. Although the computation of the checksum is relatively simple, the checksum, which covers the entire frame, must be inserted at the beginning of the frame. In conventional architectures, the host computer makes one pass through the frame to calculate the checksum, and then inserts the checksum at the beginning of the frame. The data is then read another time as it is loaded into the controller. The network controller 102 further reduces the load on the host processor 112 by assembling the frame using direct access to the system memory 128 via the descriptors 192 and the DMA controller 126. Thus, the network controller 102 frees the host processor 112 from several time consuming memory access operations.

In addition to the receive and transmit functions identified above, the network controller 102 may also be programmed to perform various segmentation functions during a transmit operation. For example, the TCP protocol allows a TCP frame to be as large as 64,000 bytes. The Ethernet protocol does not allow data transfers that large, but instead limits a network frame to about 1500 bytes plus some headers. Even in the instance of a jumbo frame option that allows 16,000 byte network frames, the protocol does not support a 64 KB frame size. In general, a transmit frame initially resides in one or more of the data buffers 194 in system memory 128, having a MAC header, an IP header, and a TCP header, along with up to 64 KB of data. Using the descriptor management unit 130, the frame headers are read, and an appropriate amount of data (as permitted by the Ethernet or network protocol) is taken and transmitted. The descriptor management unit 130 tracks the current location in the larger TCP frame and sends the data block by block, each block having its own set of headers.

For example, when a data transmit is to occur, the host processor 112 writes a descriptor 192 and informs the controller 102. The descriptor management unit 130 receives a full list of pointers, which identify the data buffers 194, and determines whether TCP segmentation is warranted. The descriptor management unit 130 then reads the header buffers and determines how much data can be read. The headers and an appropriate amount of data are read into the assembly RAM 160 and the frame is assembled and transmitted. The controller 102 then re-reads the headers and the next block or portion of the untransmitted data, modifies the headers appropriately and forms the next frame in the sequence. This process is then repeated until the entire frame has been sent, with each transmitted portion undergoing any selected security processing in the IPsec system 124.

The network controller 102 also advantageously incorporates IPSec processing therein. In contrast with conventional systems that offload IPSec processing, the present invention employs on-board IPSec processing, which may be implemented as a single-chip device 102*a* (FIG. 3). In conventional systems, either the host processor carries out IPSec processing or a co-processor, separate from the network controller, is employed. Use of the host processor is very slow, and in either case, the frame passes at least three times through the memory bus. For example, when a co-processor is used, the frame passes through the bus once as it is read from memory and sent to the co-processor, again as it passes back to the system memory, and a third time as it is sent to the network controller. This processing consumes significant bandwidth on the PCI bus and negatively impacts system performance. A similar performance loss is realized in the receive direction.

IPSec processing has two primary goals: first is to encrypt, or scramble, the data so that an unauthorized person or system cannot read the data. The second goal is authentication, which ensures that the packet is uncorrupted and that the packet is from the expected person or system. A brief discussion of the on-board IPSec processing follows below. The network controller 102 takes advantage of security associations (SAs) using the SA memory interface 142, the SA lookup 146, and the SA memory 140. As briefly highlighted above, a security association is a collection of bits that describe a particular security protocol, for example, whether the IPSec portion 124 is to perform an encryption or authentication, or both, and further describes what algorithms to employ. There are several standard encryption and authentication algorithms, so the SA interface 142 and SA lookup 146 indicates which one is to be used for a particular frame. The SA memory 140 in the present example is a private memory, which stores the encryption keys. The SAs are obtained according to an IPSec protocol whereby sufficient information is exchanged with a user or system on the network to decide which algorithms to use and allow both parties to generate the same keys. After the information exchange is completed, the software calls the driver 190, which writes the results into the SA memory 140.

Once the key exchange is complete, the appropriate bits reside in the SA memory 140 that indicate which key is to be used and which authentication algorithm, as well as the actual keys. In transmit mode, part of the descriptor 192 associated with a given outgoing frame includes a pointer into the SA memory 140. When the descriptor management unit 130 reads the descriptor 192, it sends a request to the SA memory interface 142 to fetch the key, which then sends the key to the key FIFO 172, that feeds the TX IPSec processing modules 174a and 174b, respectively. When both encryption and authentication are to be employed in transmit, the process is slightly different because the tasks are not performed in parallel. The authentication is a hash of the encrypted data, and consequently, the authentication waits until at least a portion of the encryption has been performed. Because encryption may be iterative over a series of data blocks, there may be a delay between the beginning of the encryption process and the availability of the first encrypted data. To avoid having this delay affect device performance, the exemplary network interface 102 employs two TX IPSec process engines 174a and 174b, wherein one handles the odd numbered frames and the other handles the even numbered frames in the illustrated example.

Prior to performing the IPSec processing, the TX IPsec parser 170 parses the frame headers and looks for mutable fields therein, which are fields within the headers that are not authenticated because they vary as the frame travels over the network 108. For example, the destination address in the IP header varies as the frame goes across the Internet from router to router. The transmit IPsec parser 170 identifies the mutable fields and passes the information to the TX IPSec processors 174, which selectively skip over the mutable field portions of the frames. The processed frames are sent to FIFOs 178a and 178b and subsequently accumulated in the memory 118. The result of the authentication processing is an integrity check value (ICV), which is inserted by insertion block 179 into the appropriate IPsec header as the frame is transmitted from the memory 118 to the network media 108.

In receive mode, a received frame comes into the MAC 122 and the RX parser 144. The RX parser 144 parses the incoming frame up to the IPsec headers and extracts information therefrom. The fields that are important to the RX parser 144 are, for example, the destination IP address in the IP header, the SPI (Security Protocol Index), and a protocol bit that indicates whether an IPSec header is an authentication header (AH) or an encapsulation security protocol (ESP) header. Some of the extracted information passes to the SA lookup block 146. The SA lookup block 146 identifies the appropriate SA and conveys the information to the SA memory interface 142 that retrieves the SA and places it into the key FIFO 152.

The SA lookup block 146 employs an on-chip SPI Table and the off-chip SA memory 140. The SPI Table is organized into 4096 bins, each comprising 4 entries. The entries include the 32-bit SPI, a hash of the destination address (DA), a bit to indicate the protocol, and a bit to indicate whether the entry is used. Corresponding entries in the SA memory contain the full DAs and the SA (two SAs when there is both authentication and encryption). The bin for each entry is determined by a hash of the SPI. To look up an SA, a hash of the SPI from the received frame is used to determine which bin to search. Within the bin, the SA lookup block 146 searches the entries for a match to the full SPI, the destination address hash, and the protocol bit. After searching, the SA lookup block writes an entry to the SA pointer FIFO 148, which either identifies a matching entry or indicates no match was found. A check of the DA address from the SA memory is made just before security processing. If there is no match, security processing is not performed on the frame in question. Based on the entries in the SA pointer FIFO 148, the keys are fetched from the external SA memory 140 and placed in the key FIFO 152. The RX IPSec processor 150 takes the keys that come in from the FIFO 152, reads the corresponding frame data out of the memory 118, and begins processing the frame, as required. For receive processing, decryption and authentication proceed in parallel (on receive, decryption and authentication are not sequential processes), and thus in this example only one RX IPSec processor is used.

The RX IPsec parser 154 parses the headers that follow the ESP header. Any header that follows the ESP header will be encrypted and cannot be parsed until decryption has taken place. This parsing must be completed before TCP/UDP checksums can be computed and before pad bits can be checked. The decrypted data is stored in the memory 116. To perform the TCP/UDP checksums and pad checks without having to store the frame data another time, these functions are carried out by checksum and pad check system 156 while the data is being transferred from the memory 116 to the host memory 128. In addition to the on-board IPSec processing and TCP segmentation highlighted above, the network controller 102 also provides performance improvements in the execution of interrupts. Read latencies are large when a host processor is required to read a register from a network device. These latencies negatively impact system performance. In particular, as the host processor clock speed continues to increase, the disparity between the clock speed and the time it takes to get a response from a network controller over a PCI or other host bus becomes larger. Accordingly, when a host processor needs to read from a network device, the processor must wait a greater number of clock cycles, thereby resulting in opportunity loss.

The network interface 102 avoids many read latencies by replacing read operations with write operations. Write operations are not as problematic because they can take place without involving the processor 112. Thus when write information is sent to a FIFO, as long as the writes are in small bursts, the network controller 102 can take the necessary time to execute the writes without negatively loading the processor. To avoid read operations during a transmit operation, the driver creates a descriptor 192 in the system memory 128 and then writes a pointer to that descriptor to the register 132 of the network controller 102. The DMU 130 of the controller 102 sees the contents in the register 132 and reads the necessary data directly from the system memory 128 without further intervention of the processor 112. For receive operations, the driver software 190 identifies empty buffers 194 in the system memory 128, and writes a corresponding entry to the register 132. The descriptor management unit 130 writes to pointers in the transmit descriptor rings to indicate which transmit descriptors 192 have been processed and to pointers in the status rings to indicate which receive buffers 194 have been used.

Unlike conventional architectures that require a host processor to read an interrupt register in the network controller, the present invention generates and employs a control status block (CSB) 196 located in a predetermined region of the system memory 128 (e.g., a location determined upon initialization). The network controller 102 writes to the CSB 196 any register values the system needs. More particularly, after a frame has been completely processed, prior to generating an interrupt, the network controller 102 writes a copy of the interrupt register to the CSB 196. Then the controller 102 asserts the interrupt; thus when the host processor 112 sees the interrupt in the register 132, the received data is already available in the receive data buffer 194.

Figure 5A:
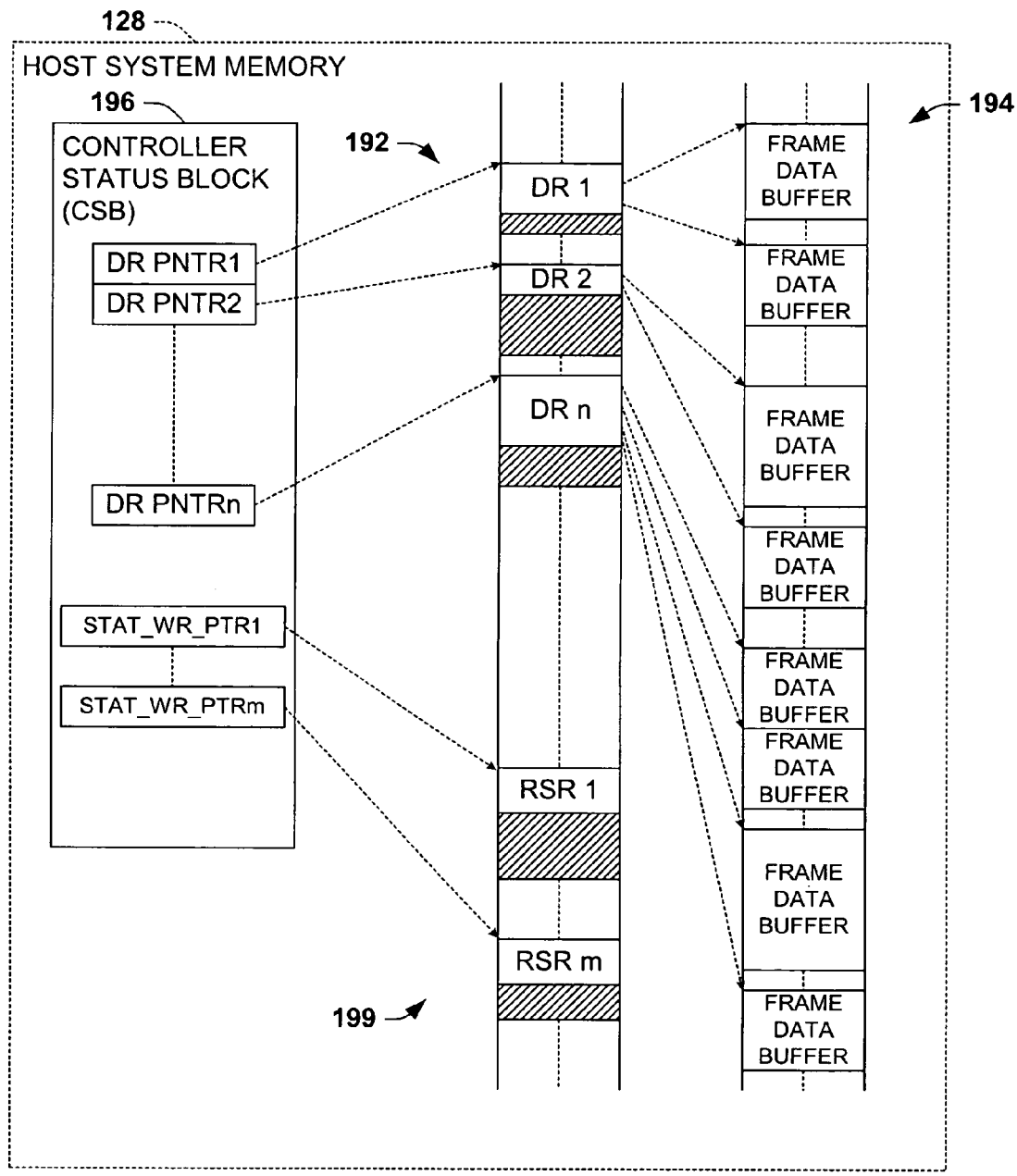
FIG. 5A is a schematic diagram illustrating a control status block in a host system memory with pointers to descriptor rings and receive status rings in the host system of FIG. 2.
Figure 5B:
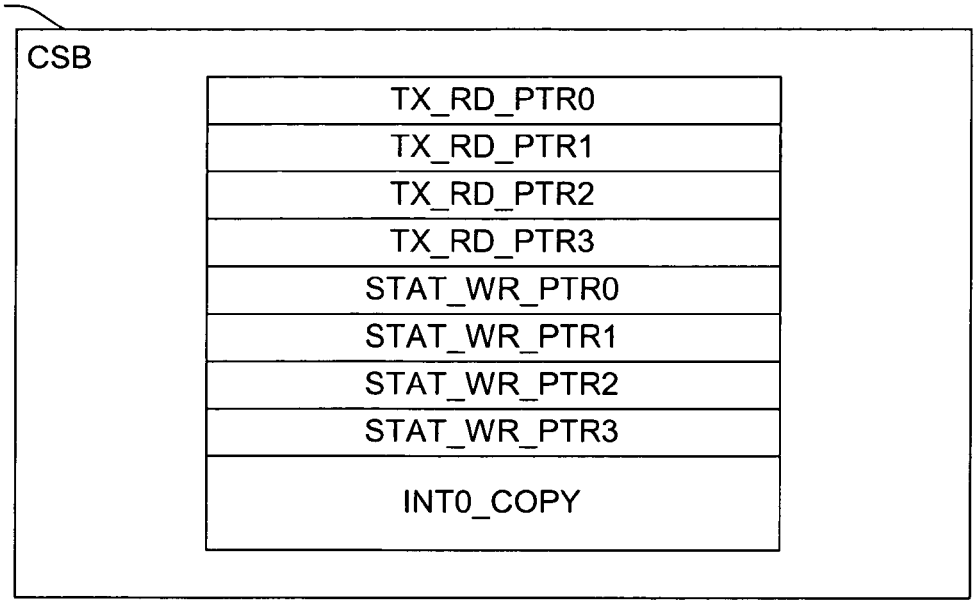
FIG. 5B is a schematic diagram illustrating a controller status block in the host memory of the host system of FIG. 2.
Figure 5C:
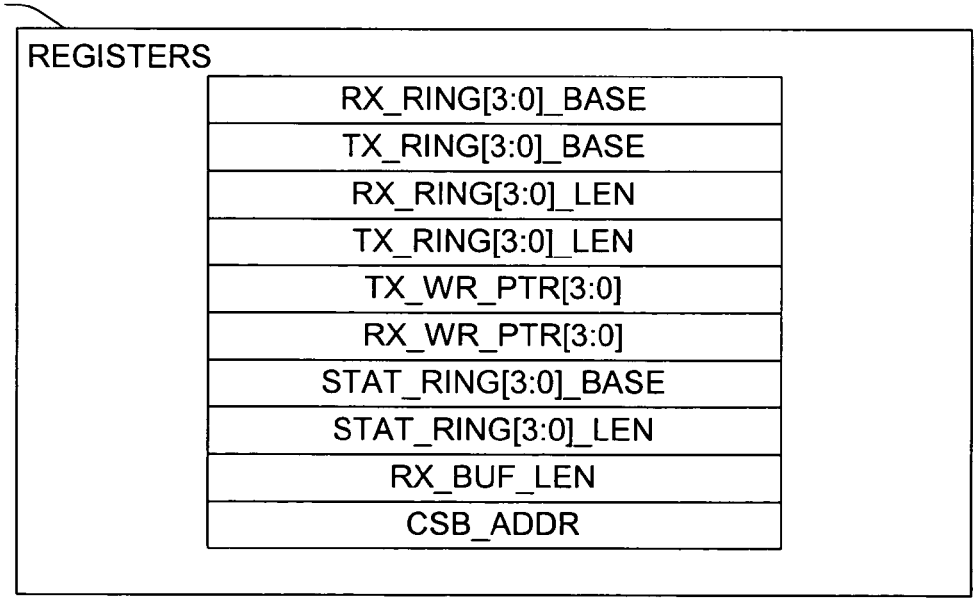
FIG. 5C is a schematic diagram illustrating descriptor management unit registers in the network interface system of FIG. 2.
Figure 5D:
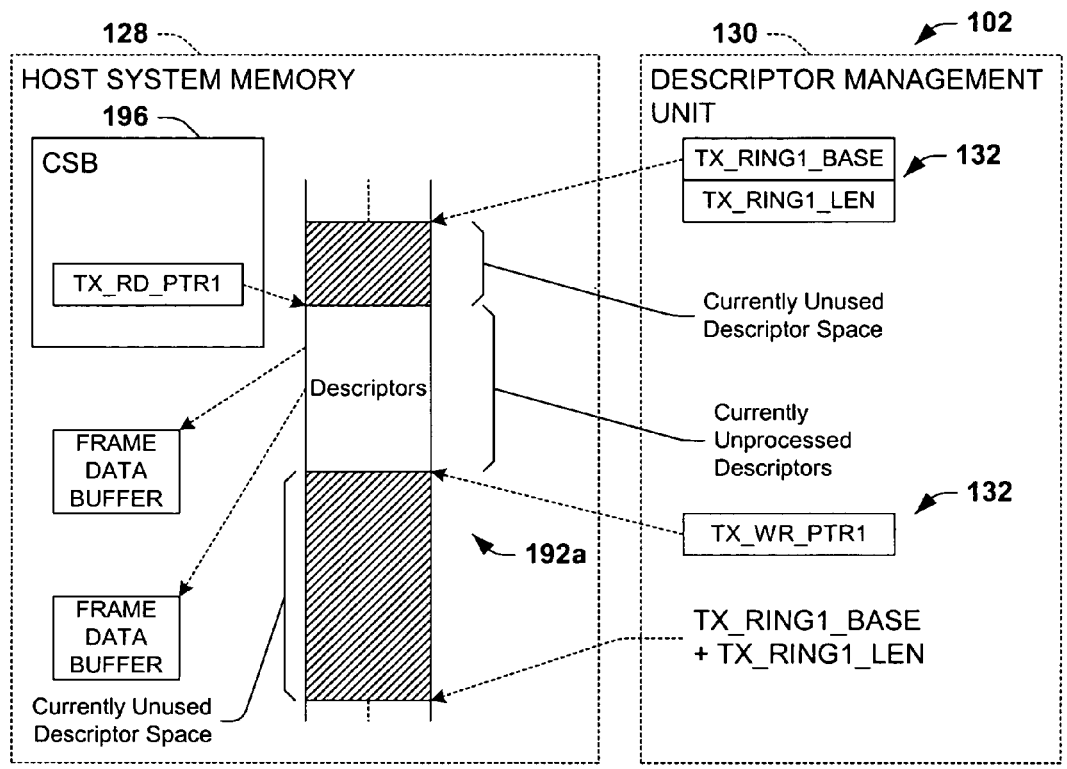
FIG. 5D is a schematic diagram illustrating an exemplary transmit descriptor ring in host system memory and pointer registers in a descriptor management unit of the network interface system of FIG. 2.
Figure 5E:
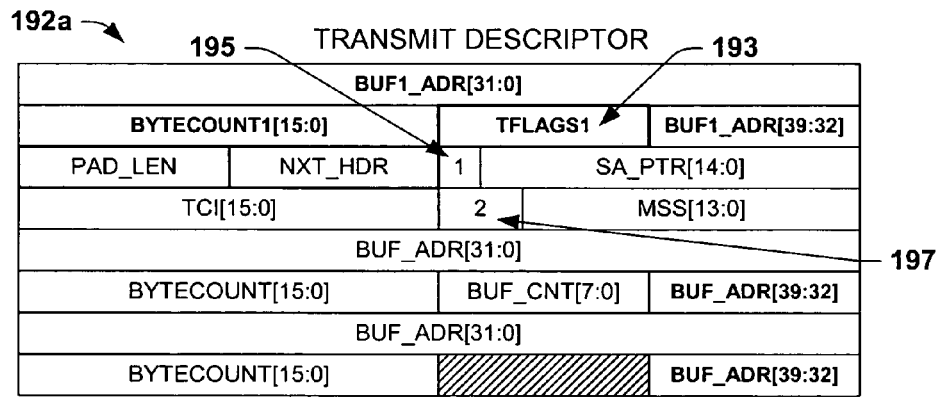
FIG. 5E is a schematic diagram illustrating an exemplary transmit descriptor in the network interface system of FIG. 2.
Figure 5F:
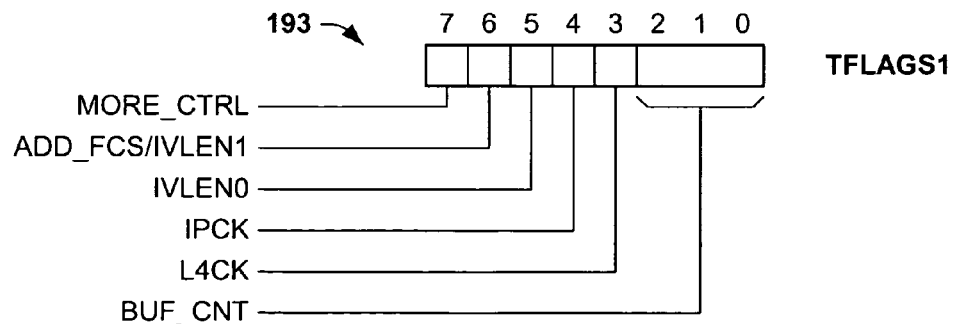
FIG. 5F is a schematic diagram illustrating a transmit flags byte in the transmit descriptor of FIG. 5E.
Figure 5I:
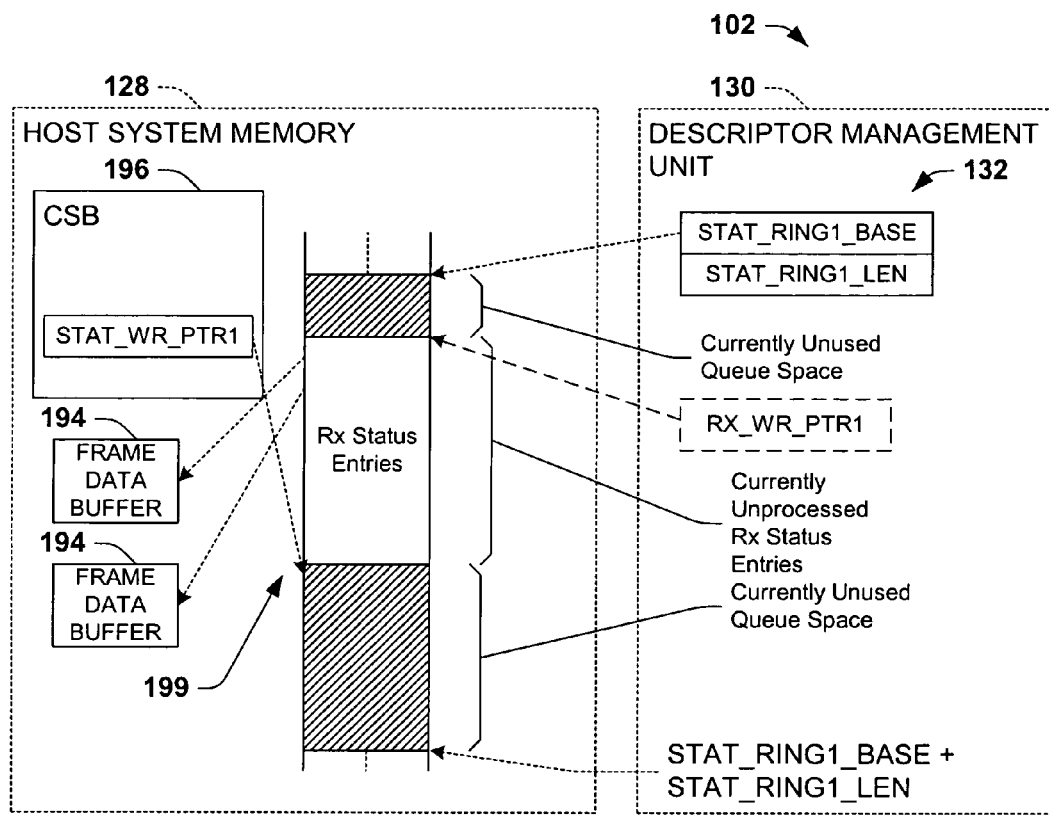
FIG. 5I is a schematic diagram illustrating an exemplary receive status ring in host system memory and pointer registers in the descriptor management unit in the network interface system of FIG. 2.
Figure 5J:
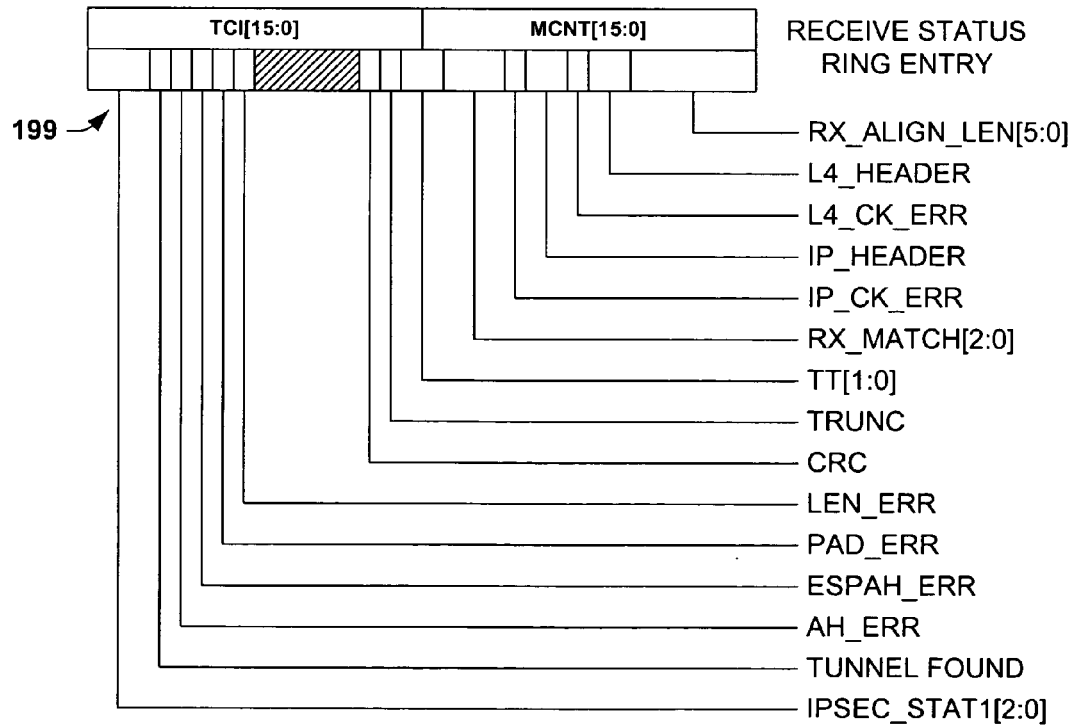
FIG. 5J is a schematic diagram illustrating an exemplary receive status ring entry in the host system memory.

Referring now to FIGS. 2, 4, and 5A-5J, further details of the descriptors 192 and the operation of the exemplary controller 102 are illustrated and described below. FIG. 5A illustrates the host memory 128, including the controller status block (CSB) 196, frame data buffers 194, an integer number 'n' descriptor rings DR1 . . . DRn for transmit and receive descriptors 192, and an integer number 'm' receive status rings 199 RSR1 . . . RSRm. The transmit and receive descriptors 192 are stored in queues referred to herein as descriptor rings DR, and the CSB 196 includes descriptor ring pointers DR_PNTR1 . . . DR_PNTRn to the descriptor rings DR. In the exemplary controller 102, four transmit descriptor rings are provided for transmitted frames and four receive descriptor rings are provided for received frames, corresponding to four priorities of network traffic. Each descriptor ring DR in this implementation is treated as a continuous ring structure, wherein the first memory location in the ring is considered to come just after the last memory location thereof. FIG. 5B illustrates pointers and other contents of the exemplary CSB 196 and FIG. 5C illustrates various pointer and length registers 132 in the controller 102. FIG. 5D illustrates further details of an exemplary transmit descriptor ring, FIG. 5H and FIG. 5I show details relating to exemplary receive descriptor and receive status rings, respectively. FIGS. 5E and 5F illustrate an exemplary transmit descriptor, FIG. 5G illustrates an exemplary receive descriptor, and FIG. 5J illustrates an exemplary receive status ring entry.

As shown in FIG. 5A, the descriptors 192 individually include pointers to one or more data buffers 194 in the system memory 128, as well as control information, as illustrated in FIGS. 5E-5G. Synchronization between the controller 102 and the software driver 190 is provided by pointers stored in the controller registers 132, pointers stored in the CSB 196 in the system memory 128, and interrupts. In operation, the descriptor management unit 130 in the controller 102 reads the descriptors 192 via the DMA controller 126 of the bus interface 104 in order to determine the memory location of the outgoing frames to be transmitted (e.g., in the data buffers 194) and where to store incoming frames received from the network 108. The CSB 196 is written by the network controller 102 and read by the driver 190 in the host processor 112, and the descriptor management registers 132 are written by the driver 190 and read by the descriptor management unit 130 in the controller 102. The exemplary descriptor system generally facilitates information exchange regarding transmit and receive operations between the software driver 190 and the controller 102.

Referring now to FIG. 5B, the exemplary CSB 196 includes pointers into the descriptor and status rings, as well as a copy of the contents of the controller's interrupt register. Transmit pointers TX_RD_PTR0 through TX_RD_PTR3 are descriptor read pointers corresponding to transmit priorities 3 through 0, respectively, which point just beyond the last 64-bit quad word (QWORD) that the controller 102 has read from the corresponding priority transmit descriptor ring. Receive status pointers STAT_WR_PTR0 through STAT_WR_PTR3 are descriptor write pointers corresponding to transmit priorities 3 through 0, respectively, which point just beyond the last QWORD that the controller 102 has written to the corresponding priority receive status ring. The CSB 196 also comprises an interrupt zero register copy INT0_COPY, which is a copy of the contents of an interrupt 0 register in the controller 102.

FIG. 5C illustrates registers 132 related to the descriptor management unit 130 in the controller 102. Transmit descriptor base pointers TX_RING[3:0]_BASE include the memory addresses of the start of the transmit descriptor rings of corresponding priority, and the lengths of the transmit descriptor rings are provided in TX_RING[3:0]_LEN registers. Transmit descriptor write pointers are stored in registers TX_WR_PTR[3:0], where the driver software 190 updates these registers to point just beyond the last QWORD that the driver has written to the corresponding transmit descriptor ring. Receive descriptor base pointers RX_RING[3:0]_BASE include the memory address (e.g., in host memory 128) of the start of the receive descriptor rings of corresponding priority, and the lengths of these receive descriptor rings are provided in RX_RING[3:0]_LEN registers. Receive descriptor write pointers RX_WR_PTR[3:0] are updated by the driver 190 to point just beyond the last QWORD that the driver has written to the corresponding receive descriptor ring. Receive status ring base pointer registers STAT_RING [3:0]_BASE indicate the memory address of the receive status rings, and STAT_RING[3:0] BASE indicate the lengths of the corresponding receive status rings 199 in memory 128. RX_BUF_LEN indicates the number of QWORDS of the receive data buffers 194, where all the receive data buffers 194 are of the same length, and CSB_ADDR indicates the address of the CSB 196 in the host memory 128.

To further illustrate descriptor management operation in data transmission, FIG. 5D illustrates the host memory 128 and the descriptor management unit 130, including an exemplary transmit descriptor ring in the host memory 128 and the corresponding descriptor registers 132 in the descriptor management unit 130 of the controller 102. In addition, FIGS. 5E and 5F illustrate an exemplary transmit descriptor 192a and control flags thereof, respectively. In the transmit descriptor 102 of FIG. 5E, BUF1_ADR[39:0] includes an address in the host memory 128 of the first data buffer 194 associated with the descriptor 192a. The descriptor 192a also includes transmit flags (TFLAGS1, FIGS. 5E and 5F) 193, which include a MORE_CTRL bit to indicate inclusion of a second 64-bit control word with information relating to virtual local area network (VLAN) operation and TCP segmentation operation. An ADD_FCS/IVLEN1 bit and an IVLEN0 bit are used for controlling FCS generation in the absence of IPsec processing, or to indicate the length of an encapsulation security protocol (ESP) initialization vector (IV) when IPsec security and layer 4 processing are selected. An IPCK bit is used to indicate whether the controller 102 generates a layer 3 (IP layer) checksum for transmitted frames, and an L4CK flag bit indicates whether the controller 102 generates a layer 4 (e.g., TCP, UDP, etc.) checksum. Three buffer count bits BUF_CNT indicate the number of data buffers 194 associated with the descriptor 192a, if less than 8. If more than 8 data buffers 194 are associated with the descriptor 192a, the buffer count is provided in the BUF_CNT[7:0] field of the descriptor 192a.

A BYTECOUNT1[15:0] field in the descriptor 192a indicates the length of the first data buffer 194 in bytes. A PAD_LEN field includes a pad length value from an ESP trailer associated with the frame and a NXT_HDR field provides next header information (protocol data for IPv4) from the ESP trailer if the MORE_CTRL bit is set. Following the NXT_HDR field, an ESP_AUTH bit 195 indicates whether the frame includes an authentication data field in the ESP trailer, and a security association (SA) pointer field SA_PTR [14:0] points to an entry in the external SA memory 140 (FIG. 2) that corresponds to the frame. A two bit VLAN tag control command field TCC[1:0] 197 includes a command which causes the controller 102 to add, modify, or delete a VLAN tag or to transmit the frame unaltered, and a maximum segment size field MSS[13:0] specifies the maximum segment size that the TCP segmentation hardware of the controller 102 will generate for the frame associated with the descriptor 192a. If the contents of the TCC field are 10 or 11, the controller 102 will transmit the contents of a tag control information field TCI[15:0] as bytes 15 and 16 of the outgoing frame. Where the frame data occupies more than one data buffer 194, one or more additional buffer address fields BUF_ADR[39:0] are used to indicate the addresses thereof, and associated BYTECOUNT[15:0] fields are used to indicate the number of bytes in the extra frame buffers 194.

When the network software driver 190 writes a descriptor 192 to a descriptor ring, it also writes to a descriptor write pointer register 132 in the descriptor management unit registers 132 to inform the controller 102 that new descriptors 192 are available. The value that the driver writes to a given descriptor management register 132 is a pointer to a 64-bit word (QWORD) in the host memory 128 just past the descriptor 192 that it has just written, wherein the pointer is an offset from the beginning of the descriptor ring measured in QWORDs. The controller 102 does not read from this offset or from anything beyond this offset. When a transmit descriptor write pointer register (e.g., DMU register 132, such as TX_WR_PTR1 in FIG. 5D) has been written, the controller 102 starts a transmission process if a transmission is not already in progress. When the transmission process begins, it continues until no unprocessed transmit descriptors 192 remain in the transmit descriptor rings. When the controller 102 finishes a given transmit descriptor 192, the controller 102 writes a descriptor read pointer (e.g., pointer TX_RD_PTR1 in FIG. 5D) to the CSB 196.

At this point, the descriptor read pointer TX_RD_PTR1 points to the beginning of the descriptor 192 that the controller 102 will read next. The value of the descriptor 192 is the offset in QWORDs of the QWORD just beyond the end of the last descriptor that has been read. This pointer TX_RD_PTR1 thus indicates to the driver 190 which part of descriptor space it can reuse. The driver 190 does not write to the location in the descriptor space that the read pointer points to or to anything between that location and 1 QWORD before the location that the descriptor write pointer TX_WR_PTR1 points to. When the descriptor read pointer TX_RD_PTR1 is equal to the corresponding descriptor write pointer TX_WR_PTR1, the descriptor ring is empty. To distinguish between the ring empty and ring full conditions, the driver 190 insures that there is always at least one unused QWORD in the ring. In this manner, the transmit descriptor ring is full when the write pointer TX_WR_PTR1 is one less than the read pointer TX_RD_PTR1 modulo the ring size.

Referring also to FIG. 5G, an exemplary receive descriptor 192b is illustrated, comprising a pointer BUF_ADR[39:0] to a block of receive buffers 194 in the host system memory 128, and a count field BUF_MULT[7:0] indicating the number of buffers 194 in the block, wherein all the receive buffers 194 are the same length and only one buffer is used for each received frame in the illustrated example. If the received frame is too big to fit in the buffer 104, the frame is truncated, and a TRUNC bit is set in the corresponding receive status ring entry 199. FIG. 5H illustrates an exemplary receive descriptor ring comprising an integer number n receive descriptors 192b for storing addresses pointing to n receive data buffers 194 in the host memory 128. The registers 132 in the descriptor management unit 130 of the controller 102 include ring base and length registers (RX_RING1_BASE and RX_RING1_LEN) corresponding to the receive descriptor ring, as well as a receive write pointer register (RX_WR_PTR1) including an address of the next unused receive descriptor 192b in the illustrated descriptor ring, and a receive buffer length register (RX_BUF_LEN) including the length of all the buffers 194. The descriptor management unit 130 also has registers 132 (STAT_RING1_BASE and STAT_RING1_LEN) related to the location of the receive status ring having entries 199 corresponding to received data within one or more of the buffers 194. The control status block 196 in the host memory 128 also includes a register STAT_WR_PTR1 whose contents provide the address in the receive status ring of the next unused status ring location, wherein the receive status ring is considered empty if STAT_WR_PTR1 equals RX_WR_PTR1.

FIGS. 5I and 5J illustrate further details of an exemplary receive status ring 199 and an entry therefor, respectively. The exemplary receive status ring entry of FIG. 5J includes VLAN tag control information TCI[15:0] copied from the receive frame and a message count field MCNT[15:0] indicating the number of bytes received which are copied in the receive data buffer 194. A three bit IPSEC_STAT1[2:0] field indicates encoding status from the IPsec security system 124 and a TUNNEL_FOUND bit indicates that a second IP header was found in the received data frame. An AH_ERR bit indicates an authentication header (AH) failure, an ESPAH_ERR bit indicates an ESP authentication failure, and a PAD_ERR bit indicates an ESP padding error in the received frame. A CRC bit indicates an FCS or alignment error and a TRUNC bit indicates that the received frame was longer than the value of the RX_BUF_LEN register 132 (FIG. 5C above), and has been truncated. A VLAN tag type field TT[1:0] indicates whether the received frame is untagged, priority tagged, or VLAN tagged, and an RX_MATCH[2:0] field indicates a receive address match type. An IP_CK_ERR bit indicates an IPv4 header checksum error, and an IP header detection field IP_HEADER[1:0] indicates whether an IP header is detected, and if so, what type (e.g., IPv4 or IPv6). An LA_CK-ERR bit indicates a layer 4 (e.g., TCP or UDP) checksum error in the received frame and a layer 4 header detection field L4_HEADER indicates the type of layer 4 header detected, if any. In addition, a receive alignment length field RCV_ALIGN_LEN[5:0] provides the length of padding inserted before the beginning of the MAC header for alignment.

As shown in FIGS. 5H and 5I, in receive operation, the controller 102 writes receive status ring write pointers STAT_WR_PTR[3:0] (FIG. 5B) to the CSB 196. The network driver software 190 uses these write pointers to determine which receive buffers 194 in host memory 128 have been filled. The receive status rings 199 are used to transfer status information about received frames, such as the number of bytes received and error information, wherein the exemplary system provides four receive status rings 199, one for each priority. When the controller 102 receives an incoming frame from the network 108, the controller 102 uses the next receive descriptor 192 from the appropriate receive descriptor ring to determine where to store the frame in the host memory 128. Once the received frame has been copied to system memory 128, the controller 102 writes receiver status information to the corresponding receive status ring 199. Synchronization between controller 102 and the driver software 190 is provided by the receive status write pointers (STAT_WR_PTR [3:0]) in the CSB 196. These pointers STAT_WR_PTR[3:0] are offsets in QWORDs from the start of the corresponding ring.

When the controller 102 finishes receiving a frame from the network 108, it writes the status information to the next available location in the appropriate receive status ring 199, and updates the corresponding receive status write pointer STAT_WR_PTR. The value that the controller 102 writes to this location is a pointer to the status entry in the ring that it will write to next. The software driver 190 does not read this entry or any entry past this entry. The exemplary controller 102 does not have registers that point to the first unprocessed receive status entry in each ring. Rather, this information is derived indirectly from the receive descriptor pointers RX_WR_PTR. Thus, when the software driver 190 writes to one of the RX_WR_PTR registers 132 (FIG. 5C) in the controller 102, the driver 190 ensures that enough space is available in the receive status ring 199 for the entry corresponding to this buffer 104.

Although the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A system for transferring data between a host and a network using a shared memory, the system comprising:
   a plurality of data transfer queues in a shared memory, the individual data transfer queues comprising one or more descriptors indicating a memory buffer location storing the data to be transferred between the host and the network, and one or more entries, and the individual entries being associated with data, located in a memory buffer, to be transferred between the host and the network; and
   a network interface system coupled with the shared memory, the host, and the network, the network interface system comprising a descriptor management system storing a plurality of priority levels individually associated with one of the data transfer queues, wherein a first data transfer queue has a higher priority level than a second data transfer queue, and wherein the network interface system transfers data between the host and the network by transferring data associated with entries of the first data transfer queue before transferring data associated with entries of the second data transfer queue based on the priority levels of the first and second data queues;
   wherein the plurality of data transfer queues comprises a plurality of transmit descriptor rings in the shared memory, the individual transmit descriptor rings comprising a unique transmit priority level and one or more transmit descriptors, the transmit descriptors being associated with one or more data frames received from the host that are to be transferred to the network;
   wherein the descriptor management system comprises a plurality of counters individually corresponding to all but a highest priority transmit descriptor ring;
   wherein the network interface system transfers data associated with transmit descriptors of a particular transmit descriptor ring from the shared memory to the network if all data associated with transmit descriptors of higher priority transmit descriptor rings has been transferred or if a value of a counter corresponding to the particular transmit descriptor ring is greater than or equal to a threshold value associated with the particular transmit descriptor ring;
   wherein the descriptor management system clears the counter for the particular transmit descriptor ring when data associated with a transmit descriptor of the particular transmit descriptor ring is transferred from the shared memory to the network; and
   wherein the descriptor management system increments the counter for the particular transmit descriptor ring when a data frame associated with a transmit descriptor of a higher priority transmit descriptor ring is transferred from the shared memory to the network.

2. The system of claim 1, wherein each of the data transfer queues has a unique priority level.

3. The system of claim 2, wherein the plurality of data transfer queues comprises a plurality of receive descriptor rings in the shared memory, the individual receive descriptor rings comprising a unique receive priority level and one or more receive descriptors, the receive descriptors being associated with one or more data frames received from the network that are to be transferred to the host, and wherein the descriptor management system provides a receive descriptor to a particular receive descriptor ring according to the data associated with the receive descriptor.

4. The system of claim 2, wherein the plurality of data transfer queues comprises a plurality of receive descriptor rings in the shared memory, the individual receive descriptor rings comprising a unique receive priority level and one or more receive descriptors, the receive descriptors being associated with one or more data frames received from the network that are to be transferred to the host, and wherein the host reads one or more data frames from the shared memory that are associated with one or more receive descriptors of a particular receive descriptor ring only after all data associated with receive descriptors of higher priority receive descriptor rings has been read from the shared memory.

5. The system of claim 1, wherein the host provides a plurality of threshold values to the descriptor management system, the threshold values individually corresponding to all but the highest priority transmit descriptor ring.

6. The system of claim 1, wherein the host provides data to the shared memory and provides a corresponding transmit descriptor to the particular transmit descriptor ring according to a desired transmit priority for the data.

7. The system of claim 1, wherein the plurality of data transfer queues further comprises a plurality of receive descriptor rings in the shared memory, the individual receive descriptor rings comprising a unique receive priority level and one or more receive descriptors, the receive descriptors being associated with one or more data frames received from the network that are to be transferred to the host, and wherein the host reads one or more data frames from the shared memory that are associated with one or more receive descriptors of a particular receive descriptor ring only after all data associated with receive descriptors of higher priority receive descriptor rings has been read from the shared memory.

8. A network interface system for interfacing a host with a network, the network interface system comprising:

a descriptor management system storing a plurality of priority levels, the priority levels being individually associated with one of a plurality of data transfer queues in a shared memory, wherein a first data transfer queue has a higher priority level than a second data transfer queue, and wherein the network interface system transfers data between a buffer memory located within the host and the network by transferring data associated with entries of the first data transfer queue before transferring data associated with entries of the second data transfer queue based on the priority levels of the first and second data queues;

wherein the plurality of data transfer queues comprises a plurality of transmit descriptor rings in the shared memory, the individual transmit descriptor rings comprising a unique transmit priority level and one or more transmit descriptors, the transmit descriptors being associated with one or more data frames received from the host that are to be transferred to the network;

wherein the descriptor management system comprises a plurality of counters individually corresponding to all but a highest priority transmit descriptor ring;

wherein the network interface system transfers data associated with transmit descriptors of a particular transmit descriptor ring from the shared memory to the network if all data associated with transmit descriptors of higher priority transmit descriptor rings has been transferred or if a value of a counter corresponding to the particular transmit descriptor ring is greater than or equal to a threshold value associated with the particular transmit descriptor ring;

wherein the descriptor management system clears the counter for the particular transmit descriptor ring when data associated with a transmit descriptor of the particular transmit descriptor ring is transferred from the shared memory to the network; and wherein the descriptor management system increments the counter for the particular transmit descriptor ring when a data frame associated with a transmit descriptor of a higher priority transmit descriptor ring is transferred from the shared memory to the network.

9. The network interface system of claim 8, wherein each of the data transfer queues has a unique priority level.

10. The network interface system of claim 9, wherein the plurality of data transfer queues comprises a plurality of receive descriptor rings in the shared memory, the individual receive descriptor rings corresponding to a unique receive priority level and comprising one or more receive descriptors, the receive descriptors being associated with one or more data frames received from the network that are to be transferred to the host, and wherein the descriptor management system provides a receive descriptor to a particular receive descriptor ring according to the data associated with the receive descriptor.

* * * * *